(12) United States Patent
Wakui

(10) Patent No.: US 12,062,184 B2
(45) Date of Patent: Aug. 13, 2024

(54) IMAGE PROCESSING APPARATUS, AND OPERATION METHOD AND OPERATING PROGRAM THEREOF, OPERATING APPARATUS, AND OPERATION METHOD AND OPERATING PROGRAM THEREOF, AND MACHINE LEARNING SYSTEM

(71) Applicant: FUJIFILM CORPORATION, Tokyo (JP)

(72) Inventor: Takashi Wakui, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 417 days.

(21) Appl. No.: 17/485,535

(22) Filed: Sep. 27, 2021

(65) Prior Publication Data
US 2022/0012895 A1     Jan. 13, 2022

Related U.S. Application Data

(63) Continuation of application No. PCT/JP2020/014954, filed on Mar. 31, 2020.

(30) Foreign Application Priority Data

Apr. 2, 2019  (JP) .................. 2019-070660

(51) Int. Cl.
*G06T 7/149*     (2017.01)
*G06F 18/2431*    (2023.01)
(Continued)

(52) U.S. Cl.
CPC .......... *G06T 7/149* (2017.01); *G06F 18/2431* (2023.01); *G06N 20/00* (2019.01); *G06T 7/11* (2017.01); *G06T 2207/20081* (2013.01)

(58) Field of Classification Search
CPC .......... G06N 3/08; G06N 3/045; G06N 20/00; G06N 3/0464; G06T 7/11;
(Continued)

(56) References Cited

U.S. PATENT DOCUMENTS

2005/0231616 A1 * 10/2005 Iwai ...................... H04N 23/81
                                                              348/241
2016/0259963 A1     9/2016 Cohen et al.
(Continued)

FOREIGN PATENT DOCUMENTS

JP       2008-217706 A      9/2008
JP       2012043049 A  *    3/2012
(Continued)

OTHER PUBLICATIONS

Machine translation of JP-2012043049-A (Year: 2012).*
International Search Report issued in International Application No. PCT/JP2020/014954 on Jun. 23, 2020.
Written Opinion of the ISA issued in International Application No. PCT/JP2020/014954 on Jun. 23, 2020.

*Primary Examiner* — Aaron W Carter
*Assistant Examiner* — Courtney Joan Nelson
(74) *Attorney, Agent, or Firm* — SOLARIS Intellectual Property Group, PLLC

(57) ABSTRACT

An image processing apparatus includes an extraction unit that extracts, from among a plurality of designated regions in which labels of classes are designated, complicated regions which are regions of at least a part of the designated regions and are regions having relatively complicated contours, in an annotation image given as learning data to a machine learning model for performing semantic segmentation in which a plurality of the classes in an image are discriminated on a per-pixel basis, and a setting unit that sets additional labels for the complicated regions separately from original labels originally designated for the annotation image.

11 Claims, 17 Drawing Sheets

(51) Int. Cl.
*G06N 20/00* (2019.01)
*G06T 7/11* (2017.01)

(58) Field of Classification Search
CPC . G06T 2207/20081; G06T 2207/20084; G06T 7/33; G06T 7/10; G06T 7/12; G06T 3/4046; G06T 7/149; G06T 7/0012; G06T 7/246; G06T 7/13; G06T 11/203; G06T 5/70; G06T 2219/2021; G06F 18/214; G06F 18/24; G06F 18/241; G06F 18/2431; G06F 40/169; G06F 7/00; G06V 10/82; G06V 10/764; G06V 20/698; G06V 20/70; G06V 20/695; G06V 10/25; G16H 10/60; G16H 50/20

See application file for complete search history.

(56) References Cited

U.S. PATENT DOCUMENTS

| | | |
|---|---|---|
| 2018/0165509 A1 | 6/2018 | Cohen et al. |
| 2018/0285698 A1 | 10/2018 | Yamada |
| 2018/0336683 A1 | 11/2018 | Feng et al. |
| 2019/0043203 A1* | 2/2019 | Fleishman ............... G06F 18/29 |

FOREIGN PATENT DOCUMENTS

| | | |
|---|---|---|
| JP | 2016-534709 A | 11/2016 |
| JP | 2018-173814 A | 11/2018 |
| JP | 2018-195293 A | 12/2018 |

* cited by examiner

IMAGE PROCESSING APPARATUS, AND OPERATION METHOD AND OPERATING PROGRAM THEREOF, OPERATING APPARATUS, AND OPERATION METHOD AND OPERATING PROGRAM THEREOF, AND MACHINE LEARNING SYSTEM

CROSS-REFERENCE TO RELATED APPLICATIONS

This application is a continuation application of International Application No. PCT/JP2020/014954, filed on Mar. 31, 2020, the disclosure of which is incorporated herein by reference in its entirety. Further, this application claims priority from Japanese Patent Application No. 2019-070660, filed on Apr. 2, 2019, the disclosure of which is incorporated herein by reference in its entirety.

BACKGROUND

1. Technical Field

A disclosed technology relates to an image processing apparatus, and an operation method and an operating program thereof, an operating apparatus, and an operation method and an operating program thereof, and a machine learning system.

2. Description of the Related Art

Semantic segmentation in which a plurality of classes in an image are discriminated on a per-pixel basis has been known. The semantic segmentation is realized by a machine learning model (hereinafter, simply a model) such as a U-shaped convolutional neural network (U-Net; U-shaped Neural Network).

The class may be referred to as a type of an object appearing in an input image. Speaking plainly, the semantic segmentation is to discriminate the class of the object appearing in the input image and a contour thereof. The model outputs a discrimination result of the class and the contour of the object as an output image. In a case where three objects, for example, a cup, a book, and a mobile phone appear in the input image, in the output image, the cup, the book, and the mobile phone are ideally discriminated as the classes and contour lines in which the contours of these objects are faithfully outlined are drawn in these objects.

As described in JP2016-534709A, in order to improve the discrimination accuracy of the class of the model, it is necessary to train the model by giving learning data to the model and update the model. The learning data includes a learning input image and an annotation image in which labels of classes in the learning input image are designated.

SUMMARY

In the annotation image, the labels of the same class may be designated in a region having a relatively complicated contour such as a contour complicated in a zigzag (hereinafter, referred to as a complicated region) and a region having a relatively simple contour such as a smooth contour (hereinafter, referred to as a simple region). In a case where the model is trained by giving, as the learning data, the annotation image in a state in which the complicated region and the simple region are not distinguished, the weight of the evaluation is biased to the simple region in a case where the discrimination accuracy of the class is evaluated, a learning effort is not given to the complicated region. Thus, the discrimination accuracy of the complicated region in the output image may decrease.

An object of the disclosed technology is to provide an image processing apparatus, an operation method and an operating program thereof, an operating apparatus, an operation method and an operating program thereof, and a machine learning system capable of suppressing a decrease in discrimination accuracy of a region having a relatively complicated contour in a machine learning model for performing semantic segmentation.

In order to achieve the above object, an image processing apparatus of the present disclosure comprises an extraction unit that extracts, from among a plurality of designated regions in which labels of classes are designated, complicated regions which are regions of at least a part of the designated regions and are regions having relatively complicated contours, in an annotation image given as learning data to a machine learning model for performing semantic segmentation in which a plurality of the classes in an image are discriminated on a per-pixel basis, and a setting unit that sets additional labels for the complicated regions separately from original labels originally designated for the annotation image.

It is preferable that the setting unit sets the same additional label for a plurality of the complicated regions extracted from the plurality of designated regions in which the original labels indicate the same class.

It is preferable that the extraction unit performs processing of extracting the complicated region for each of the plurality of designated regions.

It is preferable that in a case where the extraction unit extracts, as the complicated region, a boundary between a first designated region and a second designated region, the setting unit selectively sets one additional label related to any one of the first designated region or the second designated region for the complicated region of the boundary.

It is preferable that the setting unit sets, for a small complicated region equal to or less than a set size among the complicated regions, the original label of the designated region including the small complicated region.

An operation method of an image processing apparatus of the present disclosure comprises extracting, from among a plurality of designated regions in which labels of classes are designated, complicated regions which are regions of at least a part of the designated regions and are regions having relatively complicated contours, in an annotation image given as learning data to a machine learning model for performing semantic segmentation in which a plurality of the classes in an image are discriminated on a per-pixel basis, and setting additional labels for the complicated regions separately from original labels originally designated for the annotation image.

An operating program of an image processing apparatus of the present disclosure causes a computer to function as an extraction unit that extracts, from among a plurality of designated regions in which labels of classes are designated, complicated regions which are regions of at least a part of the designated regions and are regions having relatively complicated contours, in an annotation image given as learning data to a machine learning model for performing semantic segmentation in which a plurality of the classes in an image are discriminated on a per-pixel basis, and a setting unit that sets additional labels for the complicated regions separately from original labels originally designated for the annotation image.

An operating apparatus of the present disclosure comprises a processing unit that inputs an input image to the machine learning model which is trained by using the annotation image for which the additional label is set as the learning data to cause the machine learning model to perform the semantic segmentation, and outputs an output image, and a replacement unit that replaces the additional label of the output image with the original label based on label information storing a relationship between the original label and the additional label.

An operation method of an operating apparatus of the present disclosure comprises inputting an input image to the machine learning model which is trained by using the annotation image for which the additional label is set as the learning data to cause the machine learning model to perform the semantic segmentation, and outputting an output image, and replacing the additional label of the output image with the original label based on label information storing a relationship between the original label and the additional label.

An operating program of an operating apparatus of the present disclosure causes a computer to function as a processing unit that inputs an input image to the machine learning model which is trained by using the annotation image for which the additional label is set as the learning data to cause the machine learning model to perform the semantic segmentation, and outputs an output image, and a replacement unit that replaces the additional label of the output image with the original label based on label information storing a relationship between the original label and the additional label.

A machine learning system of the present disclosure comprises an extraction unit that extracts, from among a plurality of designated regions in which labels of classes are designated, complicated regions which are regions of at least a part of the designated regions and are regions having relatively complicated contours, in an annotation image given as learning data to a machine learning model for performing semantic segmentation in which a plurality of the classes in an image are discriminated on a per-pixel basis, a setting unit that sets additional labels for the complicated regions separately from original labels originally designated for the annotation image, a processing unit that inputs an input image to the machine learning model which is trained by using the annotation image for which the additional label is set as the learning data to cause the machine learning model to perform the semantic segmentation, and outputs an output image, and a replacement unit that replaces the additional label of the output image with the original label based on label information storing a relationship between the original label and the additional label.

According to the disclosed technology, it is possible to provide an image processing apparatus, and an operation method and an operating program thereof, an operating apparatus, and an operation method and an operating program thereof, and a machine learning system which are capable of suppressing a decrease in discrimination accuracy of a region having a relatively complicated contour in a machine learning model for performing semantic segmentation.

BRIEF DESCRIPTION OF THE DRAWINGS

Exemplary embodiments according to the technique of the present disclosure will be described in detail based on the following figures, wherein:

FIG. 3A illustrates a learning input image, and FIG. 3B illustrates an annotation image;

DETAILED DESCRIPTION

First Embodiment

Figure 1:
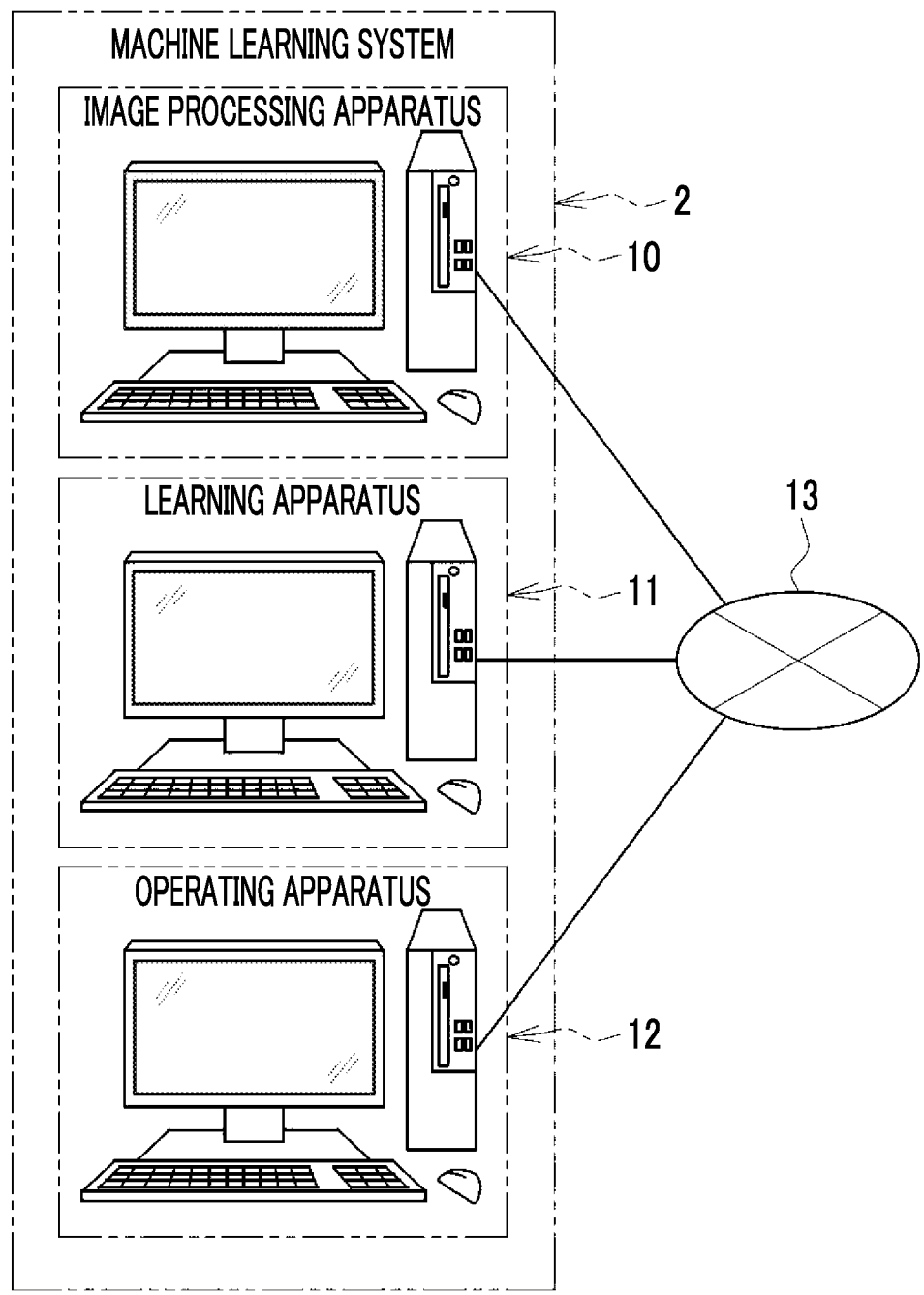
FIG. 1 is a diagram illustrating a machine learning system.

In FIG. 1, a machine learning system 2 is a system using a model M (see FIG. 2) for performing semantic segmentation in which a plurality of classes in an image are discriminated on a per-pixel basis. The machine learning system 2 comprises an image processing apparatus 10, a learning apparatus 11, and an operating apparatus 12. The image processing apparatus 10, the learning apparatus 11, and the operating apparatus 12 are, for example, desktop personal computers. The image processing apparatus 10, the learning apparatus 11, and the operating apparatus 12 are connected to each other so as to be able to communicate with each other via a network 13. The network 13 is, for example, a local area network (LAN) or a wide area network (WAN) such as the Internet or a public communication network.

Figure 2:
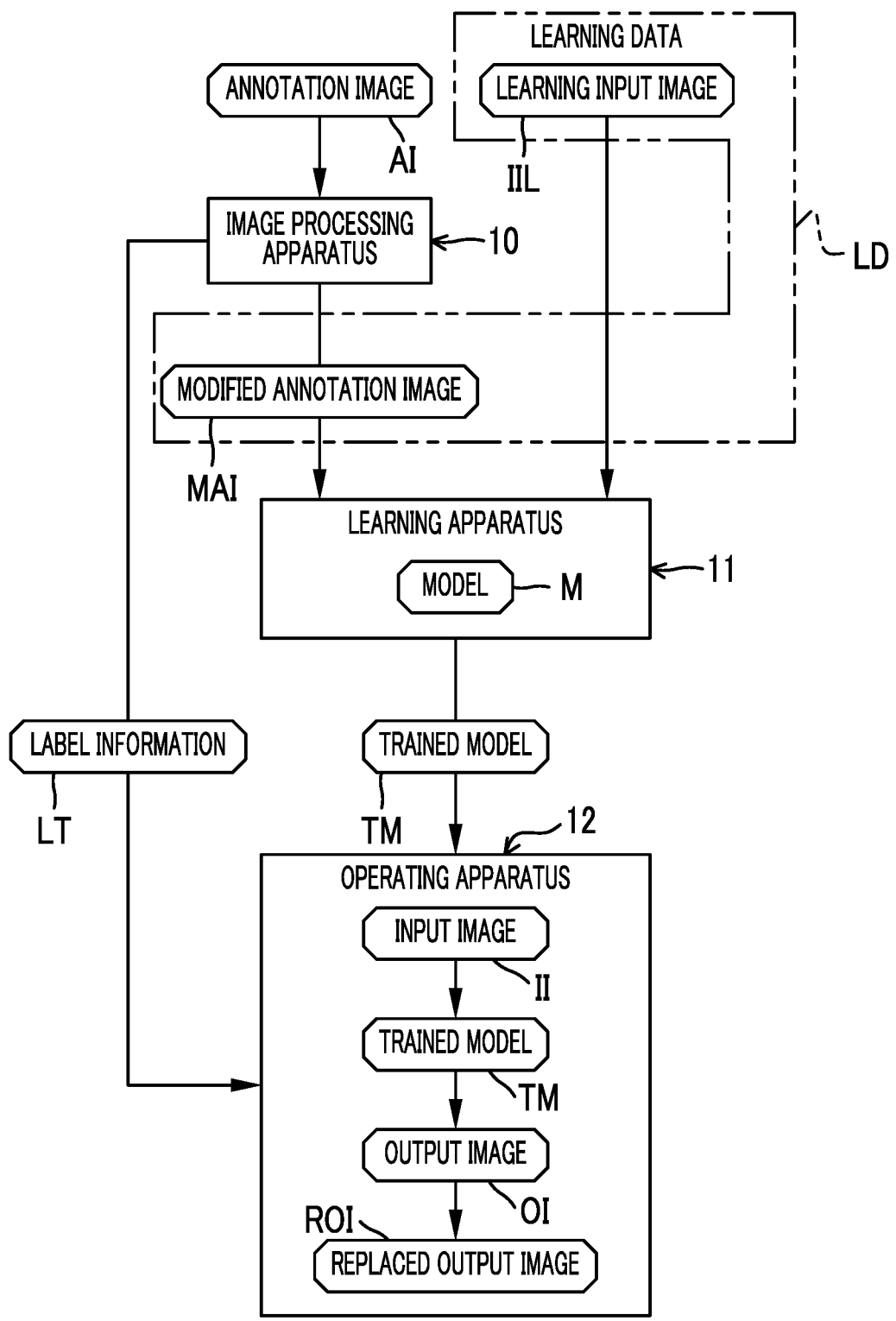
FIG. 2 is a diagram illustrating an outline of processing in the machine learning system.

In FIG. 2, the image processing apparatus 10 receives an annotation image AI. The annotation image AI is an image in which labels of classes in a learning input image IIL are designated. The image processing apparatus 10 uses the annotation image AI as a modified annotation image MAI. The modified annotation image MAI is an image to which additional labels are set separately from original labels originally designated for a complicated region CR (see FIG. 7 and the like) extracted from designated regions R (see FIGS. 3A and 3B) of the annotation image AI in which the labels of the classes are designated (see FIG. 10). The image processing apparatus 10 creates label information LT that stores a relationship between the original label and the additional label. The image processing apparatus 10 outputs the modified annotation image MAI to the learning apparatus 11 and the label information LT to the operating apparatus 12, respectively.

The learning apparatus 11 receives the modified annotation image MAI from the image processing apparatus 10. The learning apparatus 11 receives the learning input image IIL. The modified annotation image MAI and the learning input image IIL constitute learning data LD for improving discrimination accuracy of the class of the model M.

The learning apparatus 11 has the model M. The learning apparatus 11 trains the model M by giving the learning data LD to the model M, and raises the discrimination accuracy of the class of the model M to a preset level. The learning apparatus 11 outputs the model M of which the discrimination accuracy of the class is raised to the preset level to the operating apparatus 12 as a trained model TM.

The operating apparatus 12 receives the label information LT from the image processing apparatus 10. The operating apparatus 12 receives the trained model TM from the learning apparatus 11. The operating apparatus 12 gives, to the trained model TM, an input image II in which a class of an appearing object and a contour thereof have not yet been discriminated. The trained model TM discriminates the class of the object appearing in the input image II and the contour thereof, and outputs an output image OI as a discrimination result. The operating apparatus 12 obtains a replaced output image ROI by replacing additional labels of the output image OI with original labels based on the label information LT.

Figure 3A:
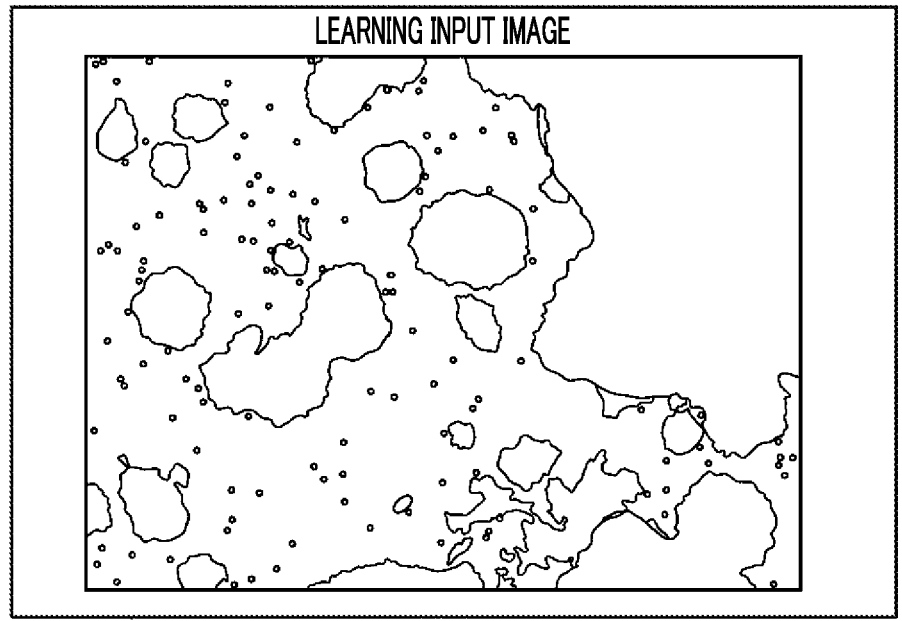
FIGS. 3A and 3B are diagrams illustrating images of a phase-contrast microscope in which cells in culture appear.
Figure 3B:
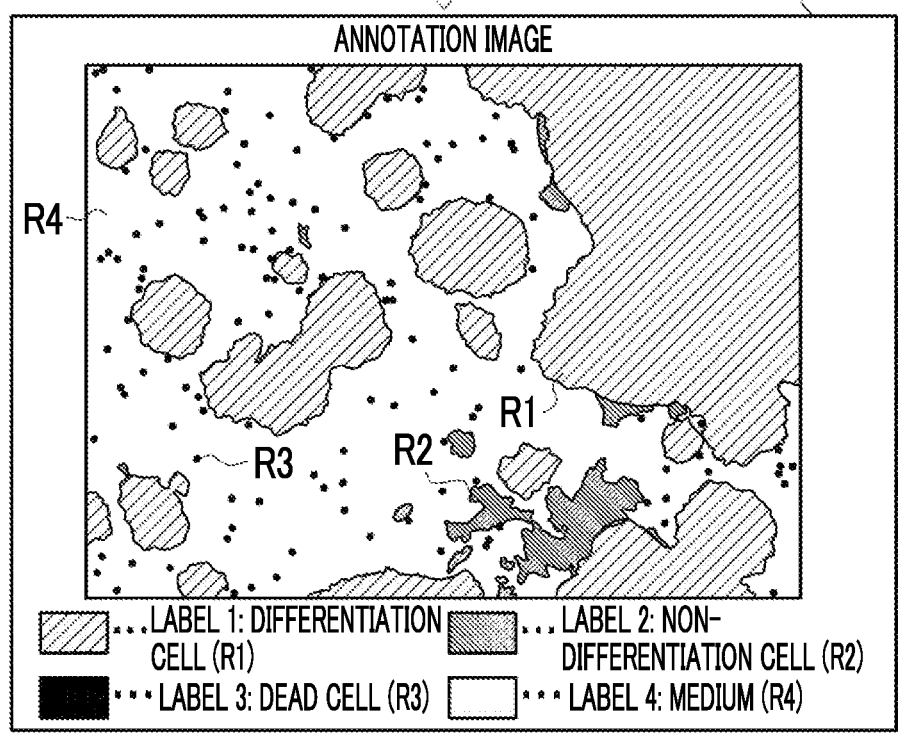

As illustrated in FIG. 3A, in this example, the learning input image IIL is an image of a phase-contrast microscope on which cells in culture appear. Differentiation cells, non-differentiation cells, dead cells, and a medium appear as objects in the learning input image IIL. In the annotation image AI in this case, as illustrated in FIG. 3B, a "differentiation cell" of a label 1, a "non-differentiation cell" of a label 2, a "dead cell" of a label 3, and a "medium" of a label 4 are manually designated. The "medium" of the label 4 is a region that is naturally designated by designating the other labels 1 to 3. Hereinafter, a region designated as the "differentiation cell" of the label 1 is referred to as a designated region R1, a region designated as the "non-differentiation cell" of the label 2 is referred to as a designated region R2, a region designated as the "dead cell" of the label 3 is referred to as a designated region R3, and a region designated as the "medium" of the label 4 is referred to as a designated region R4. In a case where it is not necessary to distinguish these regions, the designated regions R1 to R4 are collectively referred to as the designated region R as described above. Similar to the learning input image IIL, the input image II given to the trained model TM is also an image of a phase-contrast microscope in which cells in culture appear.

Figure 4:
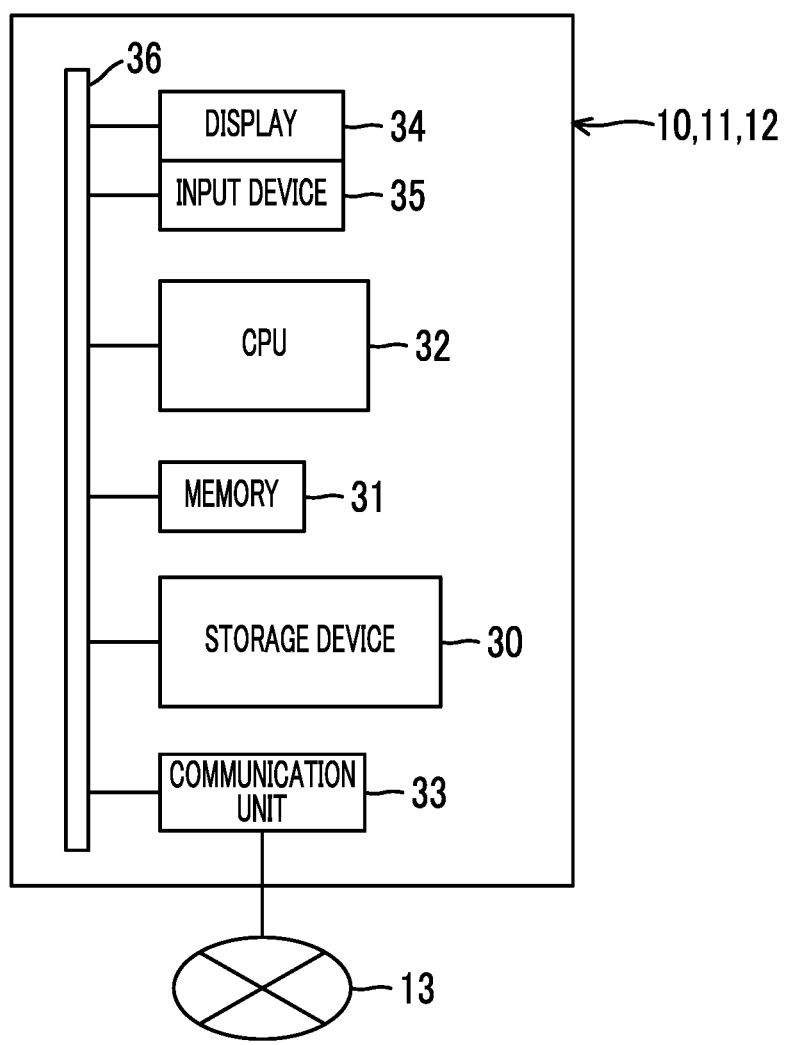
FIG. 4 is a block diagram illustrating computers constituting an image processing apparatus, a learning apparatus, and an operating apparatus.

In FIG. 4, the computers constituting the image processing apparatus 10, the learning apparatus 11, and the operating apparatus 12 have the same basic configuration, and each have a storage device 30, a memory 31, a central processing unit (CPU) 32, a communication unit 33, a display 34, and an input device 35. These components are interconnected via a busline 36.

The storage device 30 is a hard disk drive built in the computer constituting the image processing apparatus 10 or the like, or connected via a cable or a network. Alternatively, the storage device 30 is a disk array in which a plurality of hard disk drives are connected in series. The storage device 30 stores control programs such as an operating system, various application programs, and various kinds of data attached to these programs. A solid state drive may be used instead of the hard disk drive.

The memory 31 is a work memory for the CPU 32 to execute processing. The CPU 32 comprehensively controls the units of the computer by loading the program stored in the storage device 30 into the memory 31 and executing the processing according to the program.

The communication unit 33 is a network interface that controls transmission of various kinds of information via the network 13. The display 34 displays various screens. The computer constituting the image processing apparatus 10 and the like accepts an input of an operation instruction from the input device 35 through various screens. The input device 35 is a keyboard, a mouse, a touch panel, or the like.

In the following description, the units of the apparatuses are distinguished by attaching a subscript "A" to each unit of the image processing apparatus 10, a subscript "B" to each unit of the learning apparatus 11, and a subscript "C" to each unit of the operating apparatus 12.

Figure 5:
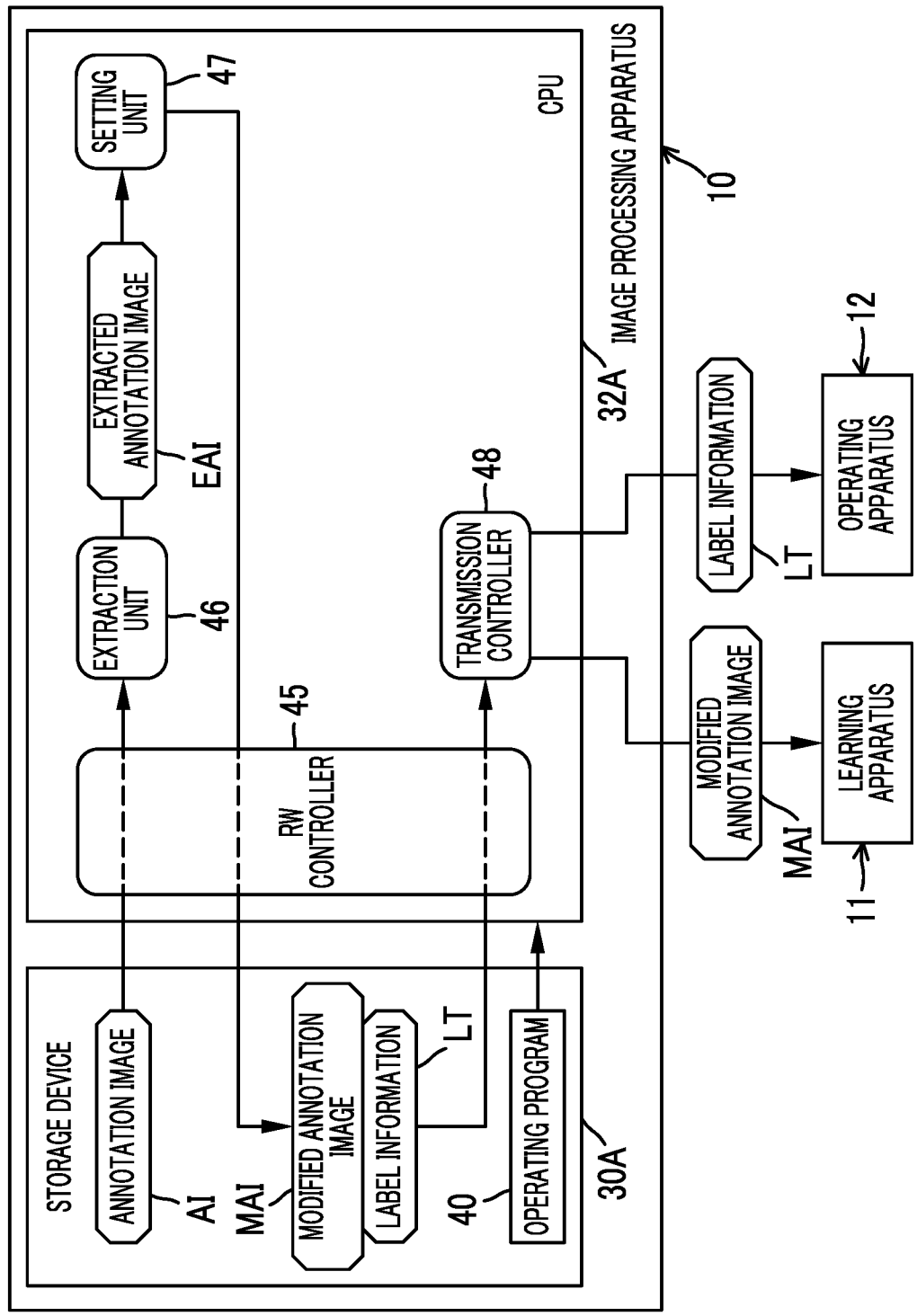
FIG. 5 is a block diagram illustrating a CPU of the image processing apparatus.

In FIG. 5, an operating program 40 is stored in the storage device 30A of the image processing apparatus 10. The operating program 40 is an application program for causing the computer to function as the image processing apparatus 10. That is, the operating program 40 is an example of an "operating program of an image processing apparatus" according to a disclosed technology.

The annotation image AI is also stored in the storage device 30A. The annotation image AI may be created and stored in advance in the image processing apparatus 10, or may be created in an apparatus different from the image processing apparatus 10, may be transmitted from the different apparatus, and may be stored.

In a case where the operating program 40 is activated, the CPU 32A of the computer constituting the image processing apparatus 10 functions as a read write (hereinafter, abbreviated as RW) controller 45, an extraction unit 46, a setting unit 47, and a transmission controller 48 in cooperation with the memory 31 and the like.

The RW controller 45 performs control such that various kinds of data in the storage device 30A are to be read out and various kinds of data are to be stored in the storage device 30A. The RW controller 45 reads out the annotation image AI from the storage device 30A and outputs the annotation image AI to the extraction unit 46.

The extraction unit 46 extracts the complicated region CR, which is a region of at least a part of the designated regions R and is a region having a relatively complicated contour, from among the plurality of designated regions R. The extraction unit 46 outputs an extracted annotation image EAI, which is the annotation image AI in which the complicated region CR is extracted, to the setting unit 47.

Here, the complicated region CR is a region defined as being complicated under preset conditions. One of the preset conditions is a condition in which an absolute size of the designated region R is used as a threshold value. Specifically, an area is, for example, 5 μm² or less in an actual size, and a pitch between mountains adjacent in a zigzag is, for example, 1 μm or less in an actual size. Alternatively, the preset condition is a condition in which a relative threshold value is set by referring to sizes of the plurality of designated regions R appearing in the annotation image AI. Specifically, the relative threshold value is, for example, 1/10 or less of a representative value (an average value, a median value, a maximum value, a minimum value, or the like) of the areas of the designated regions R in the annotation image AI or is, for example, 1/10 or less of a representative value (an average value, a median value, a maximum value, a minimum value, or the like) of the pitches between mountains adjacent in a zigzag in the designated regions R in the annotation image AI. The threshold value may be changeable by a user.

As a method for extracting the complicated region CR, for example, there is a method for applying a moving average filter (also referred to as a smoothing filter) to the annotation image AI and extracting, as the complicated region CR, a portion in which a difference between contours before and after the moving average filter is applied is larger than a threshold value. Alternatively, there are a method for performing distance transform on the annotation image AI and extracting, as the complicated region CR, a portion in which a distance from the contour is shorter than a threshold value, a method for using a model trained for extracting the complicated region CR, and the like. In either case, the threshold value may be a value based on the absolute size of the designated region R as described above, or may be a relative value by referring to the sizes of the plurality of designated regions R appearing in the annotation image AI.

The setting unit 47 sets additional labels for the complicated region CR of the extracted annotation image EAI from the extraction unit 46. The setting unit 47 outputs, to the RW controller 45, the extracted annotation image EAI for which the additional labels are set as the modified annotation image MAI. The setting unit 47 creates the label information LT and outputs the label information to the RW controller 45.

The RW controller 45 stores the modified annotation image MAI and the label information LT from the setting unit 47 in the storage device 30A. The RW controller 45 reads out the modified annotation image MAI and the label information LT from the storage device 30A, and outputs the modified annotation image and the label information to the transmission controller 48.

The transmission controller 48 performs control such that the modified annotation image MAI is to be transmitted to the learning apparatus 11. The transmission controller 48 performs control such that the label information LT is to be transmitted to the operating apparatus 12.

Figure 6:
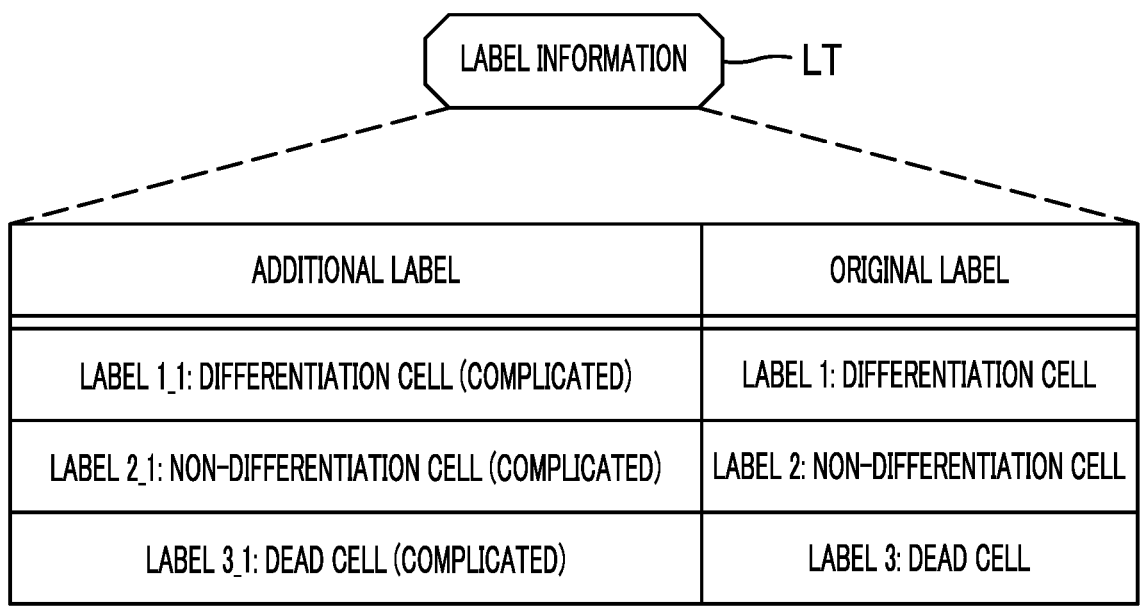
FIG. 6 is a diagram illustrating label information.

As illustrated in FIG. 6, the label information LT is information in which additional labels and original labels corresponding to the additional labels are registered. As the additional labels, there are a total of three kinds of a "differentiation cell (complicated)" of a label 1_1 which corresponds to the "differentiation cell" of the label 1 of the original label, a "non-differentiation cell (complicated)" of a label 2_1 which corresponds to the "non-differentiation cell" of the label 2, and a "dead cell (complicated)" of a label 3_1 which corresponds to the "dead cell" of the label 3.

Figure 7:
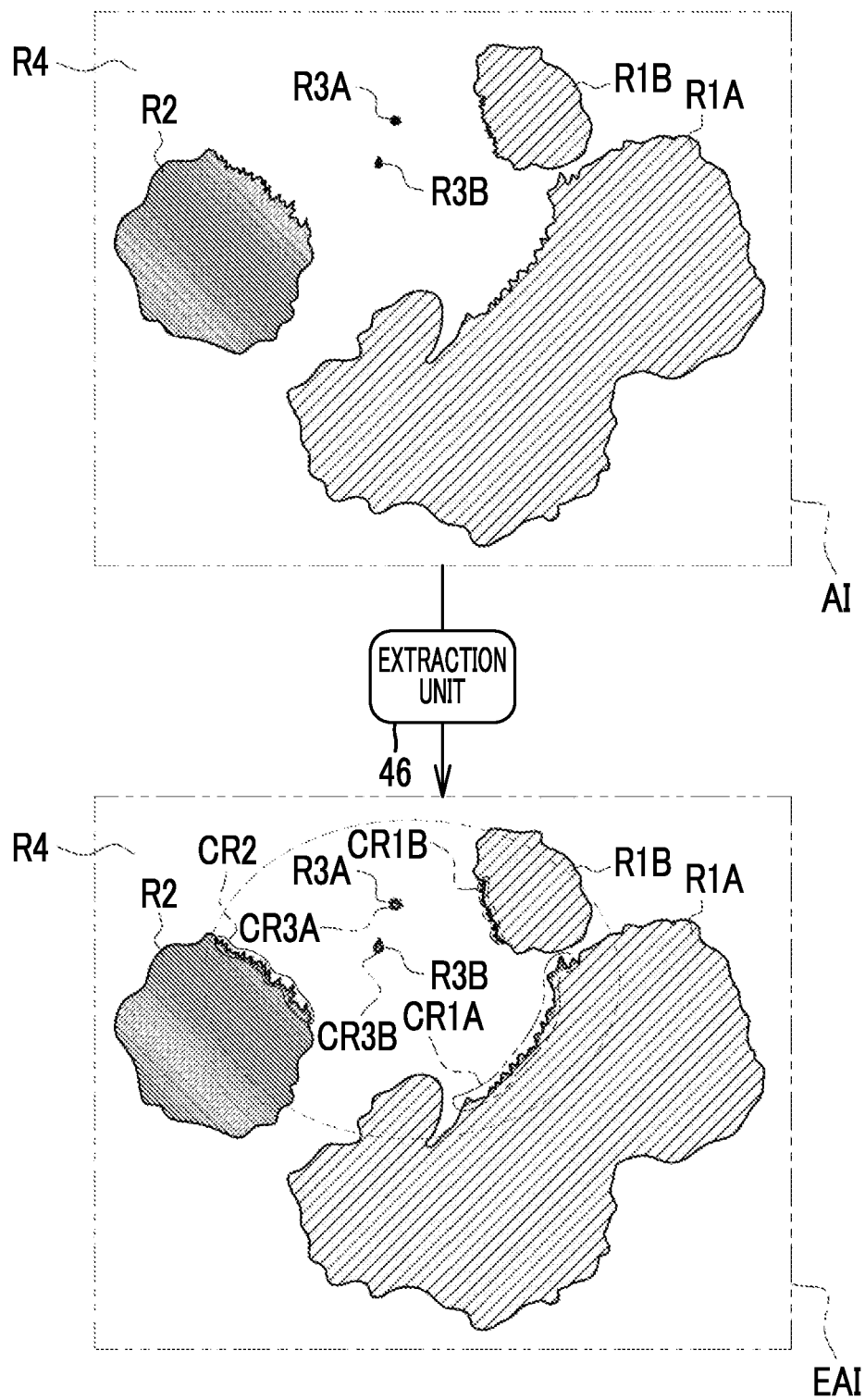
FIG. 7 is a diagram illustrating a scene in which a complicated region is extracted by an extraction unit.
Figure 8:
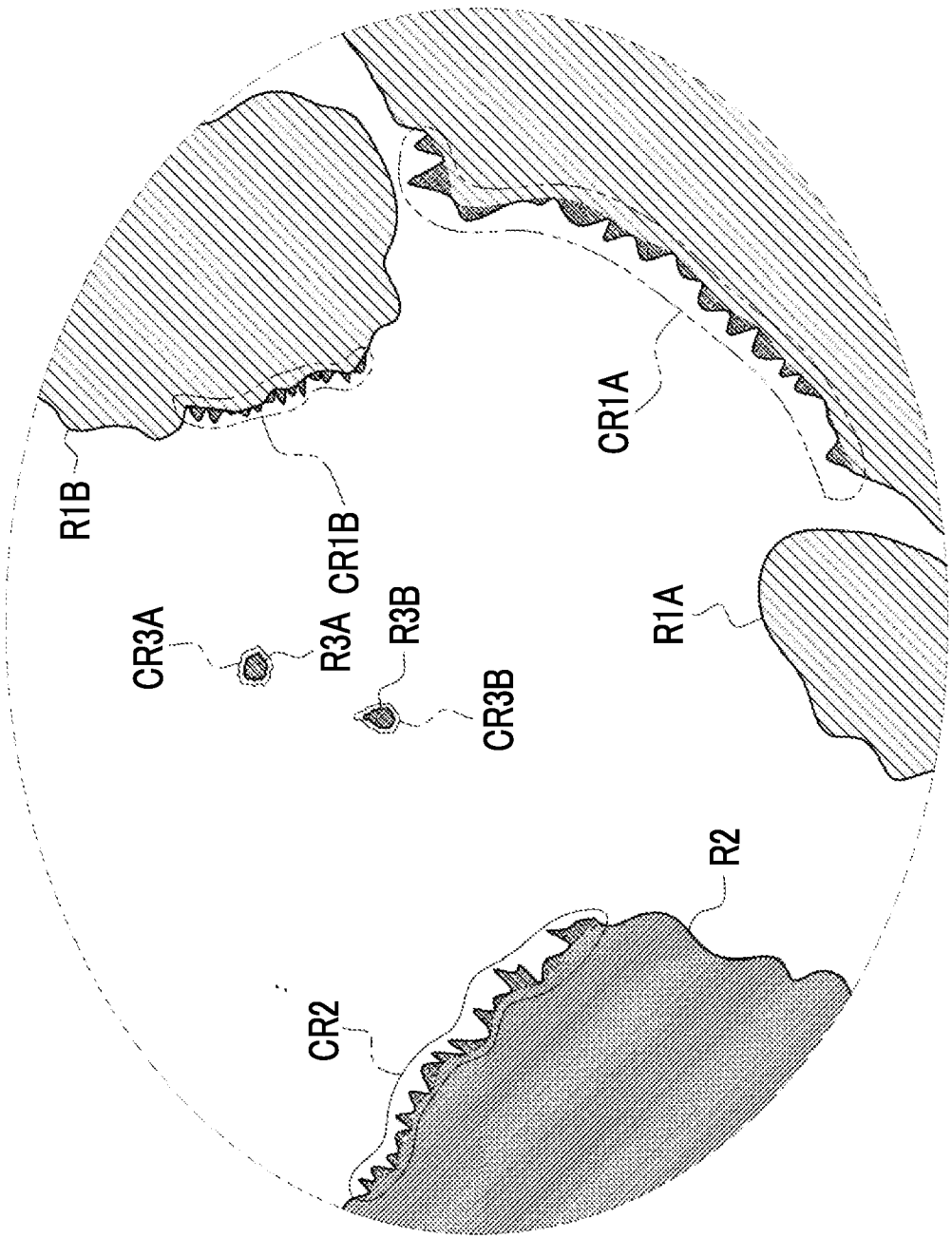
FIG. 8 is an enlarged view of a broken line portion of FIG. 7.

As illustrated in FIG. 7 and FIG. 8 in which a broken line portion of FIG. 7 is enlarged, the extraction unit 46 extracts complicated regions CR1A and CR1B from designated regions R1A and R1B of the "differentiation cell" of the label 1, a complicated region CR2 from the designated region R2 of the "non-differentiation cell" of the label 2, and complicated regions CR3A and CR3B from designated regions R3A and R3B of the "dead cell" of the label 3. The extraction unit 46 does not extract the complicated region CR from the designated region R4 of the "medium" of the label 4. Since all the differentiation cells, the non-differentiation cells, and the dead cells are surrounded by the medium, in a case where the complicated region CR is extracted from the designated region R4 of the "medium", the extracted complicated region CR overlaps the complicated regions CR1 to CR3. Similar to the designated region R, the complicated regions CR1 to CR3 may also be collectively referred to as the complicated region CR as described above.

Figure 9A:
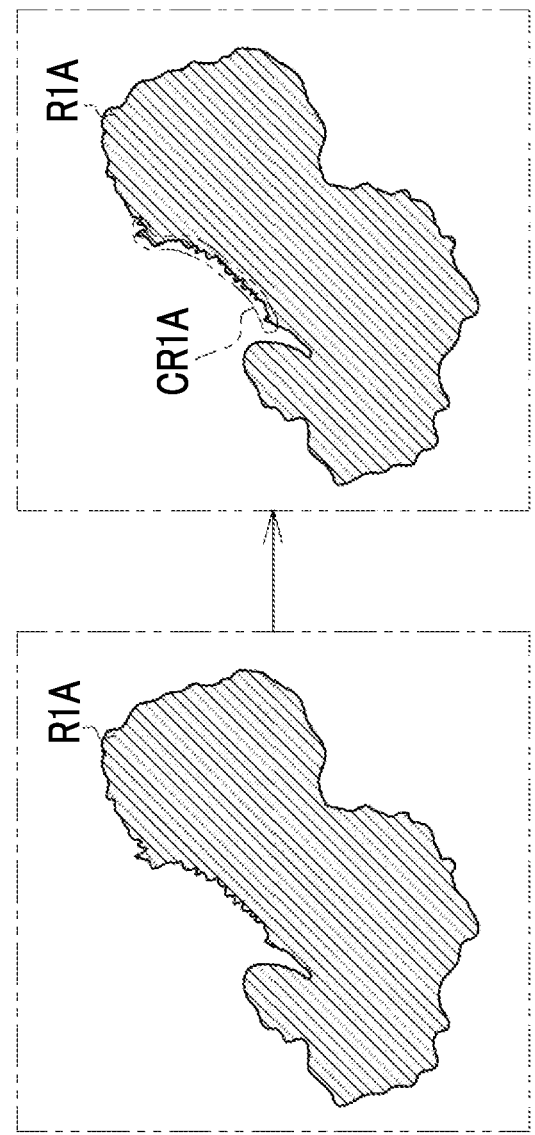
FIGS. 9A to 9E are diagrams illustrating a scene in which processing of extracting a complicated region is performed for each of a plurality of designated regions by the extraction unit.
Figure 9D:
Figure 9E:
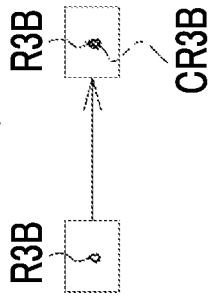
Figure 9C:
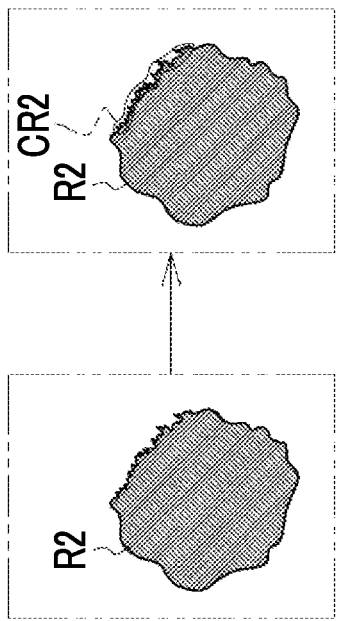
Figure 9B:
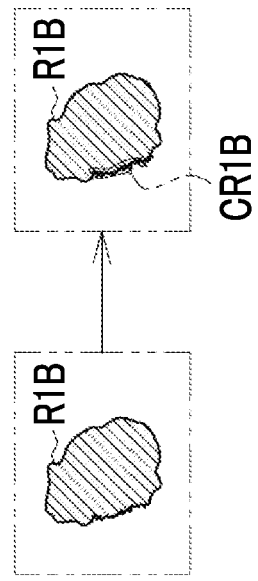

As conceptually illustrated in FIGS. 9A to 9E, the extraction unit 46 performs processing of extracting the complicated region CR for each of the plurality of designated regions R. In FIGS. 9A to 9E, a case where the complicated region CR1A is extracted from the designated region R1A as illustrated in FIG. 9A, the complicated region CR1B is extracted from the designated region R1B as illustrated in FIG. 9B, the complicated region CR2 is extracted from the designated region R2 as illustrated in FIG. 9C, the complicated region CR3A is extracted from the designated region R3A as illustrated in FIG. 9D, and the complicated region CR3B is extracted from the designated region R3B as illustrated in FIG. 9E is illustrated. The complicated regions CR1A, CR1B, and CR2 are partial regions of the designated regions R1A, R1B, and R2, and are examples of contours complicated in a zigzag. The complicated regions CR3A and CR3B are designated regions R3A and R3B themselves, and are examples of contours of fine points. In some cases, the plurality of complicated region CRs may be extracted from one designated region R.

Figure 10:
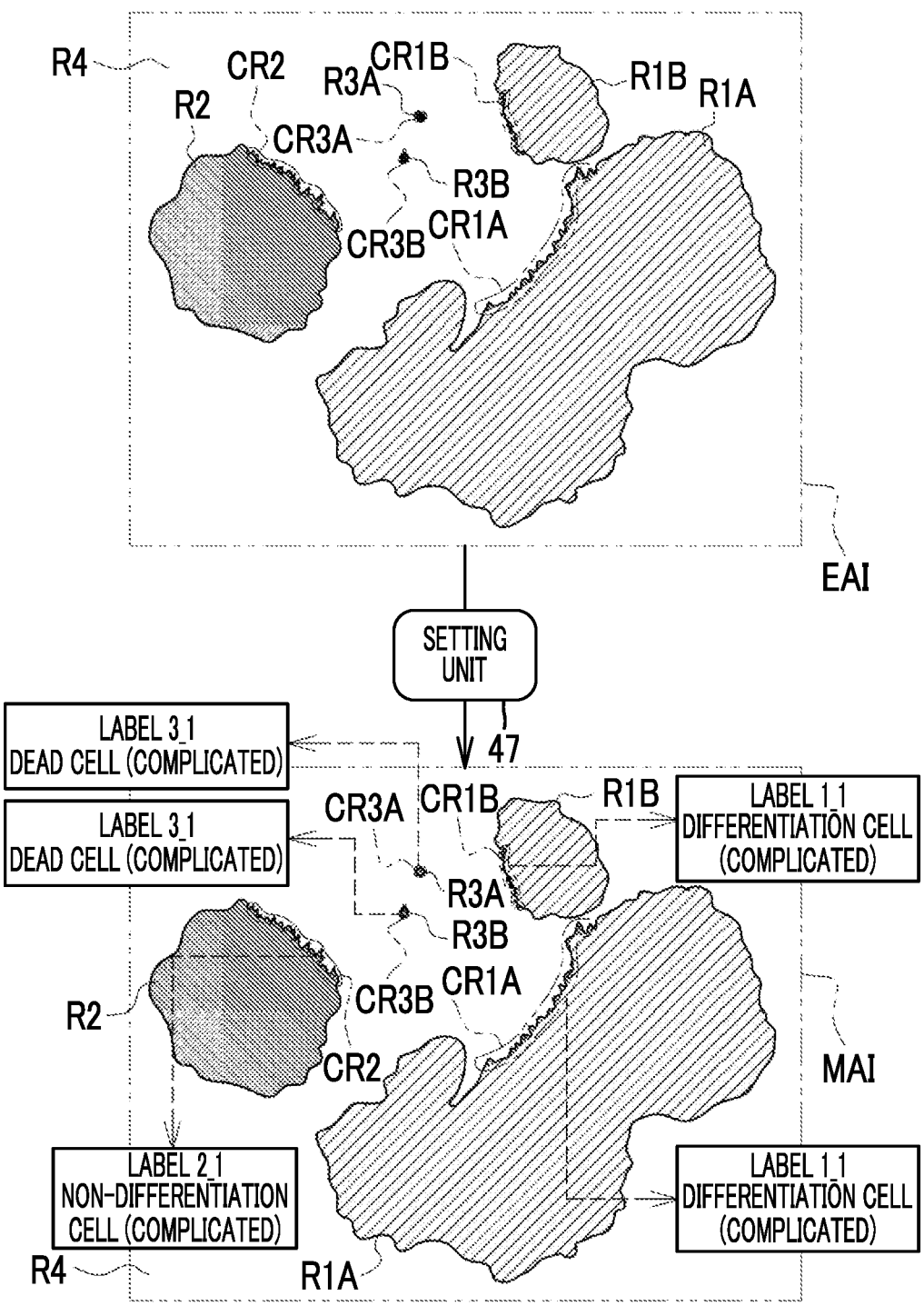
FIG. 10 is a diagram illustrating a scene in which an additional label is set by a setting unit.

FIG. 10 illustrates a scene in which the setting unit 47 sets the additional labels for the complicated region CR of the extracted annotation image EAI illustrated in FIG. 7 according to the label information LT illustrated in FIG. 6. Specifically, the setting unit 47 sets, as the additional label, the "differentiation cell (complicated)" of the label 1_1 for the complicated region CR1 of the designated region R1 of the "differentiation cell" of the label 1. The setting unit 47 sets, as the additional label, the "non-differentiation cell (complicated)" of the label 2_1 for the complicated region CR2 of the designated region R2 of the "non-differentiation cell" of the label 2. The setting unit 47 sets, as the additional label, the "dead cell (complicated)" of the label 3_1 for the complicated region CR3 of the designated region R3 of the "dead cell" of the label 3.

As can be seen from the "differentiation cell (complicated)" of the label 1_1 for the two complicated regions CR1A and CR1B of the designated region R1 of the "differentiation cell" of the label 1 and the "dead cell (complicated)" of the label 3_1 for the two complicated regions CR3A and CR3B of the designated region R3 of the "dead cell" of the label 3, the setting unit 47 sets the same additional label for the plurality of complicated region CRs extracted from the plurality of designated regions R for which the original labels indicate the same class.

Figure 11:
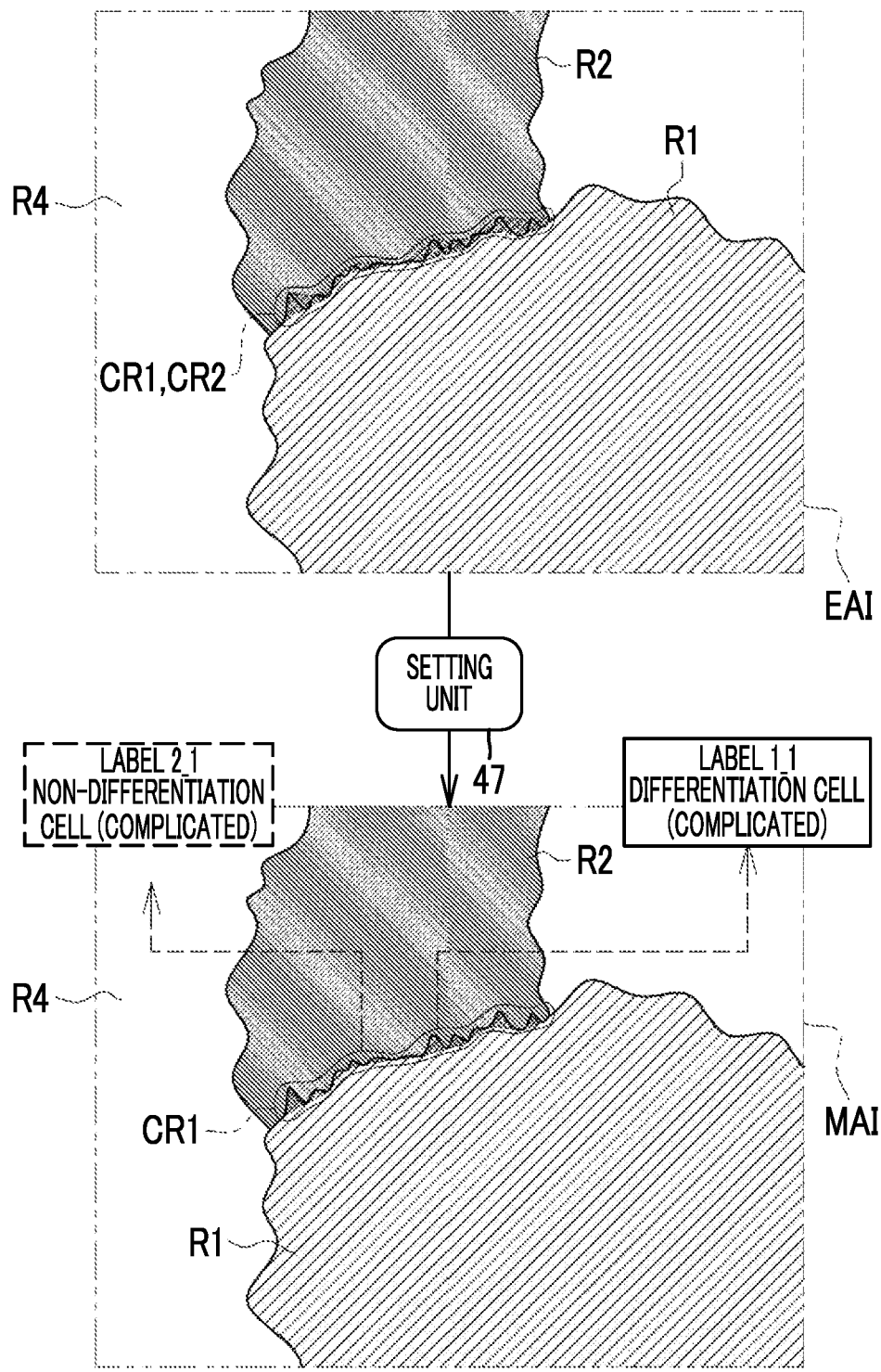
FIG. 11 is a diagram illustrating a scene in which the additional label is set by the setting unit.

As illustrated in FIG. 11, in a case where the extraction unit 46 extracts a boundary between a first designated region and a second designated region as the complicated region CR, the setting unit 47 selectively sets one additional label related to any one of the first designated region or the second designated region for the complicated region CR of the boundary.

FIG. 11 illustrates a case where the designated region R1 and the designated region R2 are in contact with each other and the boundaries between these designated regions are extracted as the complicated regions CR1 and CR2. In this case, the setting unit 47 sets, as the additional label, the "differentiation cell (complicated)" of the label 1_1 only for the complicated region CR1 of the complicated regions CR1 and CR2, and does not set the additional label for the complicated region CR2.

Figure 12:
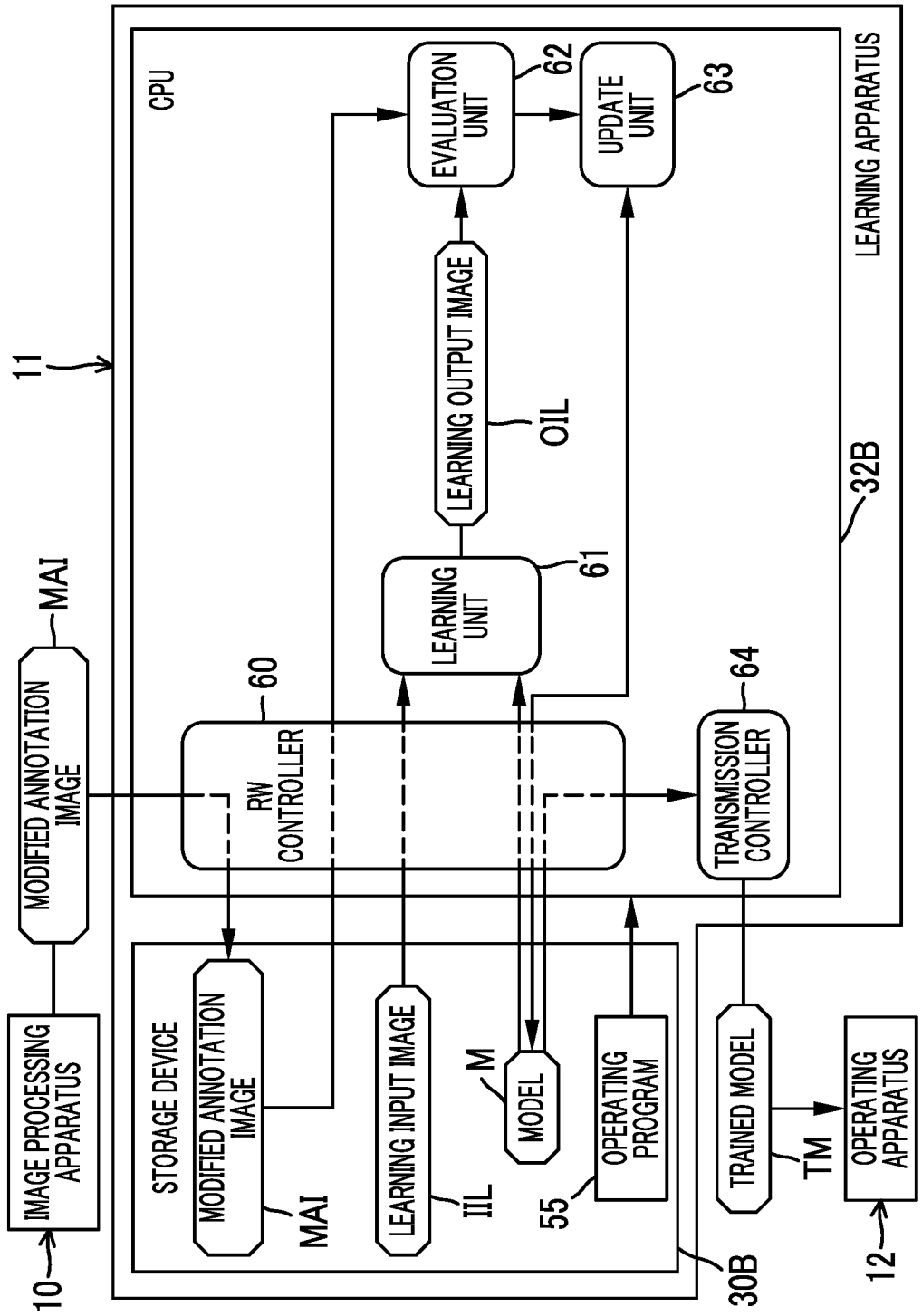
FIG. 12 is a block diagram illustrating a CPU of the learning apparatus.

In FIG. 12, an operating program 55 is stored in the storage device 30B of the learning apparatus 11. The operating program 55 is an application program for causing the computer to function as the learning apparatus 11.

The storage device 30B also stores the learning input image IIL and the model M. As described above, the learning input image IIL is an image which is a source of the annotation image AI. The model M is, for example, U-Net.

In a case where the operating program 55 is activated, the CPU 32B of the computer constituting the learning apparatus 11 functions as an RW controller 60, a learning unit 61, an evaluation unit 62, an update unit 63, and a transmission controller 64 in cooperation with the memory 31 and the like.

Similar to the RW controller 45 of the image processing apparatus 10, the RW controller 60 performs control such that various kinds of data in the storage device 30B are to be read out and various data are to be stored in the storage device 30B. The RW controller 60 stores the modified annotation image MAI from the image processing apparatus 10 in the storage device 30B. The RW controller 60 reads out the learning input image IIL from the storage device 30B, and outputs the learning input image IIL to the learning unit 61. The RW controller 60 reads out the modified annotation image MAI from the storage device 30B, and outputs the modified annotation image MAI to the evaluation unit 62. The RW controller 60 reads out the model M from the storage device 30B, and outputs the model M to any one of the learning unit 61, the update unit 63, or the transmission controller 64.

The learning unit 61 trains the model M by giving the learning input image IIL as the learning data LD to the model M. Accordingly, the learning output image OIL output from the model M is output to the evaluation unit 62 by the learning unit 61.

The learning unit 61 causes the model M to perform mini-batch learning using, for example, mini-batch data. The mini-batch data is a part (for example, 100 images) of a plurality of divided images obtained by dividing the learning input image IIL and the modified annotation image MAI (for example, 10,000 divided images divided by frames each having a size of 1/100 of the original image). The learning unit 61 trains the model M by creating a plurality of sets (for example, 100 sets) of mini-batch data and sequentially giving the sets to the model M.

The evaluation unit 62 compares the modified annotation image MAI with the learning output image OIL, and evaluates the discrimination accuracy of the class of the model M. That is, the modified annotation image MAI is an image for matching an answer with the learning output image OIL. As the discrimination accuracy of the class of the model M becomes higher, a difference between the modified annotation image MAI and the learning output image OIL becomes smaller. The evaluation unit 62 outputs an evaluation result to the update unit 63.

The evaluation unit 62 evaluates the discrimination accuracy of the class of the model M by using a loss function. The loss function is a function that expresses a degree of difference between the modified annotation image MAI and the learning output image OIL. As a calculated value of the loss function becomes closer to zero, the discrimination accuracy of the class of the model M becomes higher.

The update unit 63 updates the model M according to the evaluation result from the evaluation unit 62. Specifically, the update unit 63 changes values of various parameters of the model M by a stochastic gradient descent method or the like accompanied by a learning coefficient. The learning coefficient indicates a range of change in the values of the various parameters of the model M. That is, as the learning coefficient is a relatively larger value, the range of change in the values of the various parameters becomes wider, and a degree of update of the model M becomes larger. The model M updated by the update unit 63 is stored in the storage device 30B by the RW controller 60.

The learning of the model M by the learning unit 61, the evaluation of the discrimination accuracy of the class by the evaluation unit 62, and the update of the model M by the update unit 63 continue to be repeated until the discrimination accuracy of the class reaches a preset level.

The transmission controller 64 performs control such that the trained model TM, which is the model M for which the discrimination accuracy of the class is set to the preset level, is to be transmitted to the operating apparatus 12.

Figure 13:
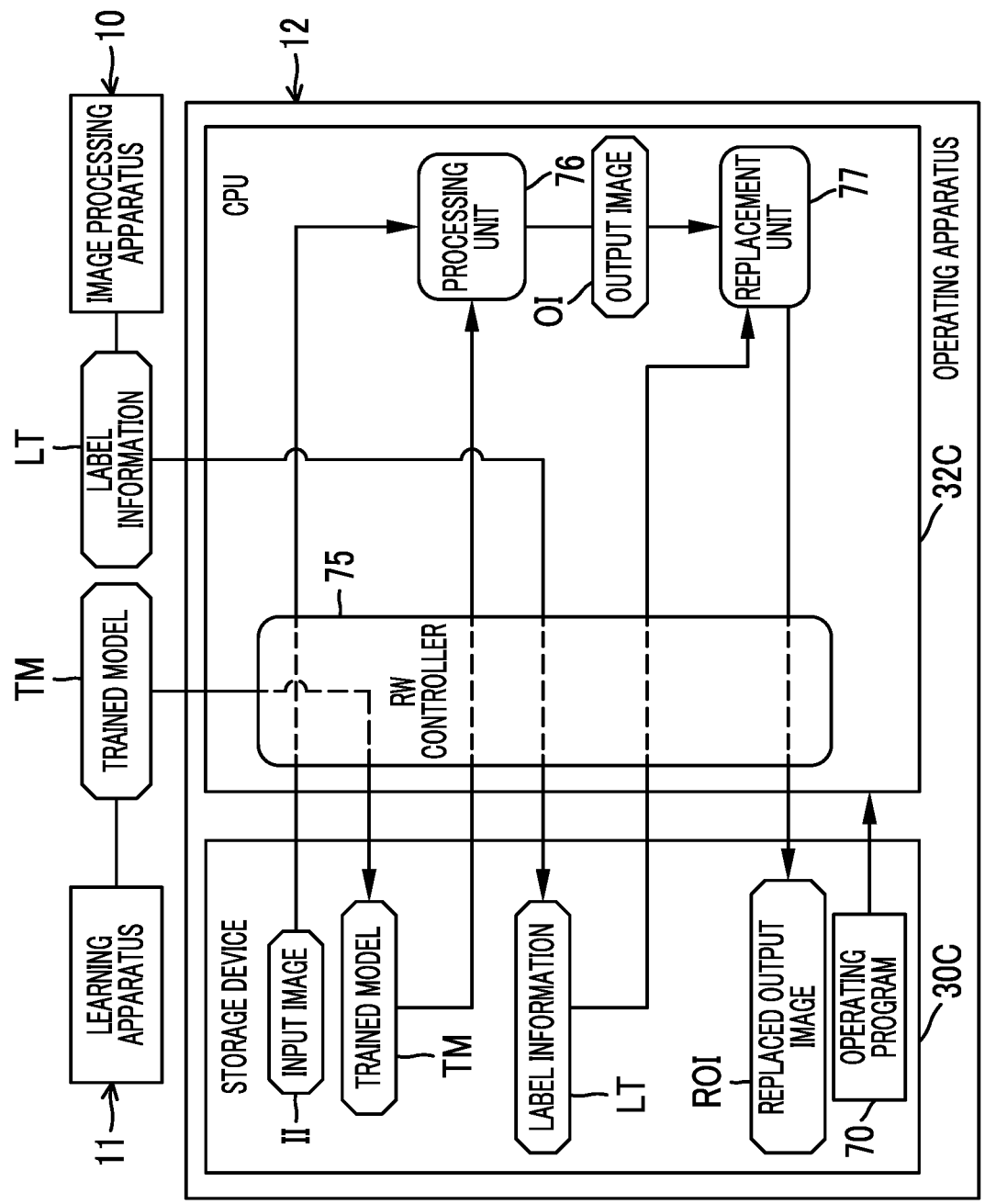
FIG. 13 is a block diagram illustrating a CPU of the operating apparatus.

In FIG. 13, an operating program 70 is stored in the storage device 30C of the operating apparatus 12. The operating program 70 is an application program for causing the computer to function as the operating apparatus 12. That is, the operating program 70 is an example of an "operating program of an operating apparatus" according to the disclosed technology.

The input image II is also stored in the storage device 30C. As described above, the input image II is an image that is given to the trained model TM and causes the trained model TM to discriminate the class of the appearing object and the contour thereof.

In a case where the operating program 70 is activated, the CPU 32C of the computer constituting the operating apparatus 12 functions as an RW controller 75, a processing unit 76, and a replacement unit 77 in cooperation with the memory 31 and the like.

Similar to the RW controller 45 of the image processing apparatus 10 and the RW controller 60 of the learning apparatus 11, the RW controller 75 performs control such that various kinds of data in the storage device 30C are to be read out and various kinds of data are to be stored in the storage device 30C. The RW controller 75 stores the label information LT from the image processing apparatus 10 in the storage device 30C. The RW controller 75 stores the trained model TM from the learning apparatus 11 in the storage device 30C. The RW controller 75 reads out the input image II and the trained model TM from the storage device 30C, and outputs the input image and the trained model to the processing unit 76. The RW controller 75 reads out the label information LT from the storage device 30C, and outputs the label information LT to the replacement unit 77.

The processing unit 76 inputs the input image II to the trained model TM to perform semantic segmentation, and outputs the output image OI. The processing unit 76 outputs the output image OI to the replacement unit 77. The replacement unit 77 replaces the additional label of the output image OI with the original label based on the label information LT. The replaced output image ROI for which is the output image OI for which the additional label is replaced with the original label by the replacement unit 77 is stored in the storage device 30C by the RW controller 75.

Figure 14:
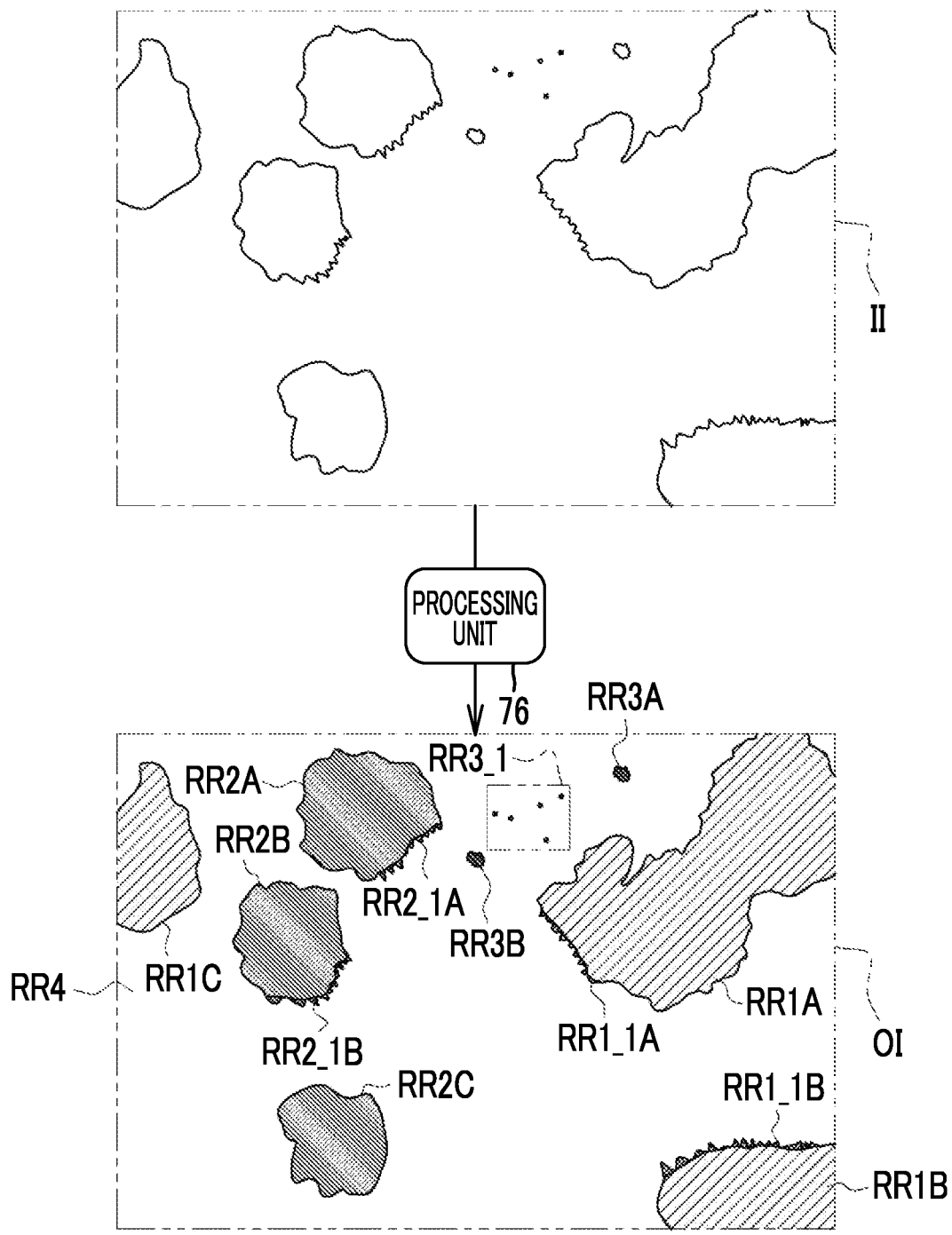
FIG. 14 is a diagram illustrating a scene in which an input image is input to a model, semantic segmentation is performed, and an output image is output by a processing unit.

Here, the trained model TM is a model trained by giving the modified annotation image MAI as the learning data LD as illustrated in FIG. 12. Thus, the trained model TM is a model that discriminates not only the classes of the original labels such as the "differentiation cell" of the label 1 and the "non-differentiation cell" of the label 2 but also the classes of the additional labels such as the "differentiation cell (complicated)" of the label 1_1 and the "non-differentiation cell (complicated)" of the label 2_1 and the contours thereof. Accordingly, as illustrated in FIG. 14, the output image OI is an image for which the region RR1_1 of the "differentiation cell (complicated)" of the label 1_1, the region RR2_1 of the "non-differentiation cell (complicated)" of the label 2_1, and the region RR3_1 of the "dead cell (complicated)" of the label 3_1 are discriminated in addition to the region RR1 of the "differentiation cell" of the label 1, the region RR2 of the "non-differentiation cell" of the label 2, and the region RR3 of the "dead cell" of the label 3, and the region RR4 of the "medium" of the label 4. A frame of a dashed double-dotted line of the output image OI illustrates a set of fine points in the region RR3 of the "dead cell" discriminated to be the region RR3_1 of the "dead cell (complicated)".

Figure 15:
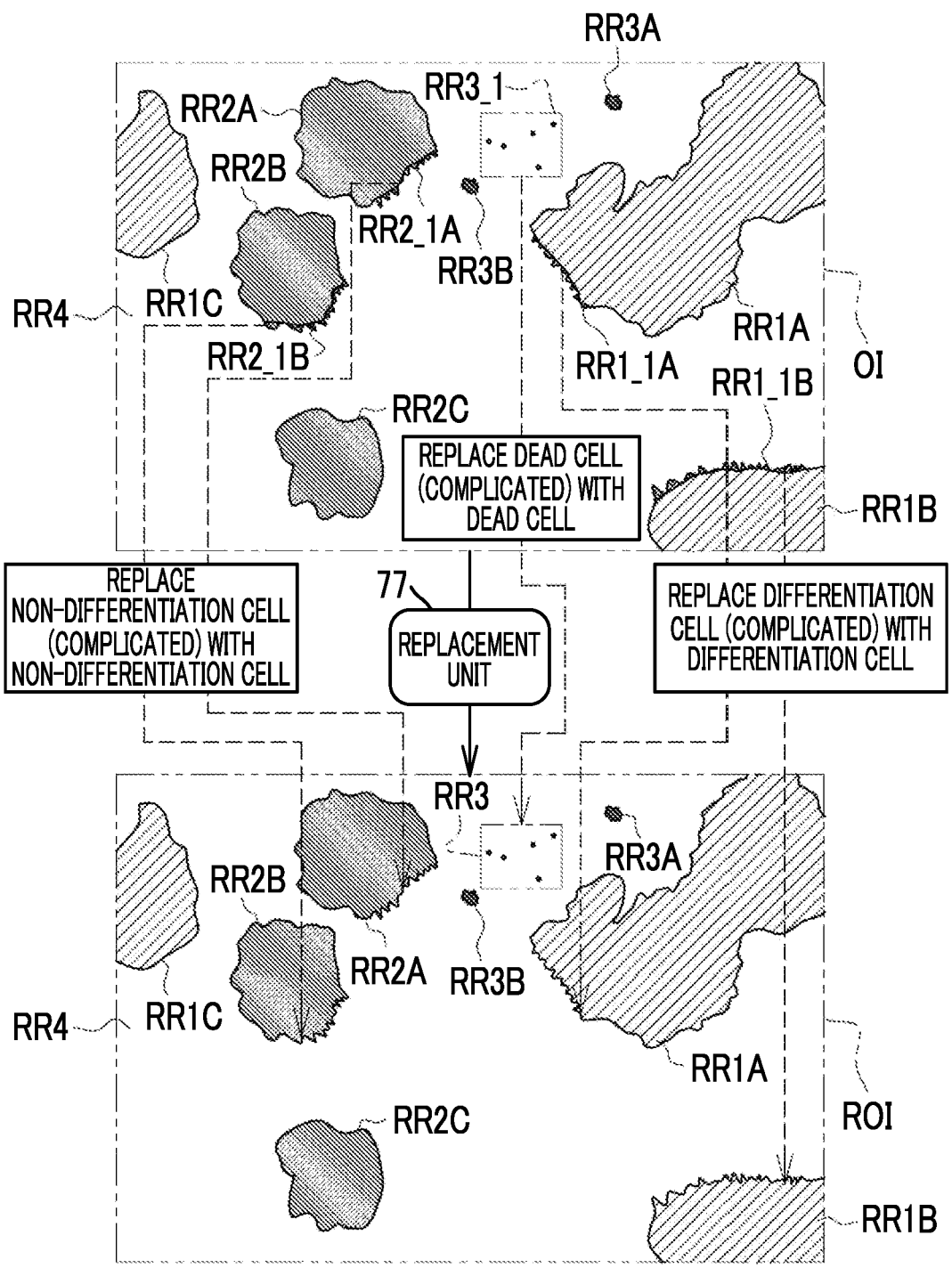
FIG. 15 is a diagram illustrating a scene in which the additional label is replaced with an original label by a replacement unit.

FIG. 15 illustrates a scene in which the replacement unit 77 replaces the additional label of the output image OI illustrated in FIG. 14 with the original label based on the label information LT illustrated in FIG. 6. Specifically, the replacement unit 77 replaces the "differentiation cell (complicated)" of the label 1_1 of the region RR1_1 (region RR1_1A and region RR1_1B) with the "differentiation cell" of the label 1, and replaces the "non-differentiation cell (complicated)" of the label 2_1 of the region RR2_1 (region RR2_1A and region RR2_1B) with the "non-differentiation cell" of the label 2. The replacement unit 77 replaces the "dead cell (complicated)" of the label 3_1 of the region RR3_1 with the "dead cell" of the label 3. By performing such replacement, in the replaced output image ROI, the region RR1_1 is included in the region RR1, the region RR2_1 is included in the region RR2, and the region RR3_1 is included in the region RR3. A frame of a dashed double-dotted line of the replaced output image ROI illustrates a set of regions RR3 in which labels are replaced from the region RR3_1.

Next, actions of the above configuration will be described with reference to the flowcharts of FIGS. 16 to 18. First, in a case where the operating program 40 is activated in the image processing apparatus 10, as illustrated in FIG. 5, the CPU 32A of the image processing apparatus 10 functions as the RW controller 45, the extraction unit 46, the setting unit 47, and the transmission controller 48.

Figure 16:
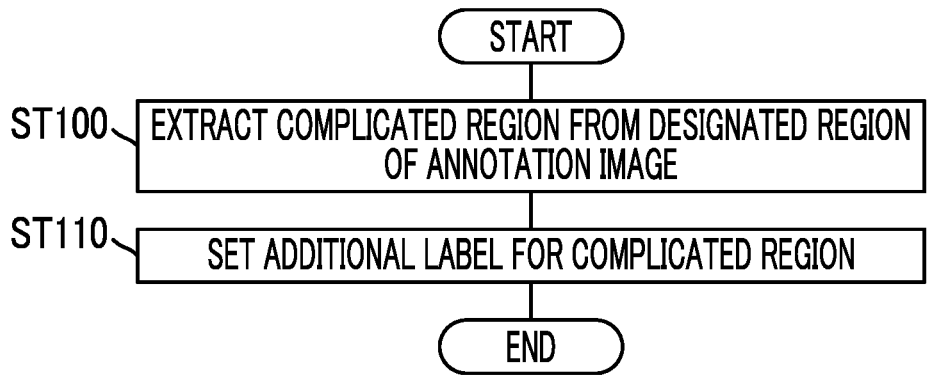
FIG. 16 is a flowchart illustrating a processing procedure of the image processing apparatus.

In FIG. 16, in the image processing apparatus 10, as illustrated in FIG. 7, the complicated region CR is extracted from the designated region R of the annotation image AI by the extraction unit 46 (step ST100). The extracted annotation image EAI in which the complicated region CR is extracted is output to the setting unit 47. Step ST100 is an example of an "extraction step" according to the disclosed technology.

As illustrated in FIG. 10, the additional label is set for the complicated region CR by the setting unit 47 (step ST110). The modified annotation image MAI for which the additional label is set is stored together with the label information LT illustrated in FIG. 6 in the storage device 30A by the RW controller 45. The modified annotation image MAI is transmitted to the learning apparatus 11 by the transmission controller 48. The label information LT is transmitted to the operating apparatus 12 by the transmission controller 48. Step ST110 is an example of a "setting step" according to the disclosed technology.

In a case where the operating program 55 is activated in the learning apparatus 11, as illustrated in FIG. 12, the CPU 32B of the learning apparatus 11 functions as the RW controller 60, the learning unit 61, the evaluation unit 62, the update unit 63, and the transmission controller 64.

Figure 17:
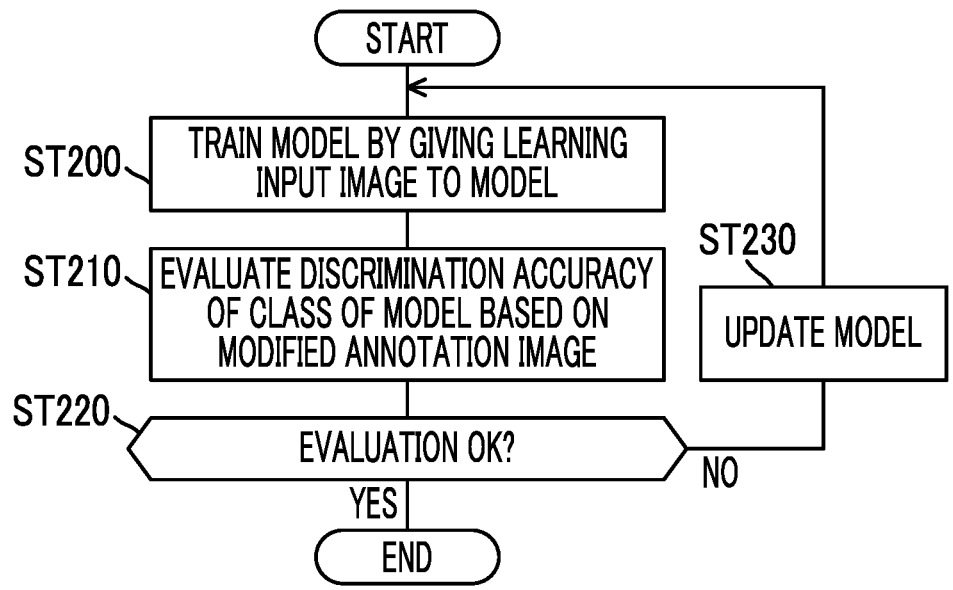
FIG. 17 is a flowchart illustrating a processing procedure of the learning apparatus.

In FIG. 17, in the learning apparatus 11, the learning unit 61 gives the learning input image IIL to the model M, and accordingly outputs the learning output image OIL from the model M (step ST200). The learning output image OIL is output to the evaluation unit 62.

The evaluation unit 62 compares the modified annotation image MAI with the learning output image OIL, and evaluates the discrimination accuracy of the class of the model M based on the comparison result (step ST210). The evaluation result is output to the update unit 63.

In a case where the evaluation result is a content in which the discrimination accuracy of the model M is less than a preset level (NO in step ST220), the model M is updated by the update unit 63 (step ST230). Step ST200 and step ST210 are repeated by using the updated model M. On the other hand, in a case where the evaluation result is the content in which the discrimination accuracy of the model M is the preset level (YES in step ST220), the processing is ended. The model M of which the discrimination accuracy is the preset level is transmitted as the trained model TM to the operating apparatus 12 by the transmission controller 64.

In a case where the operating program 70 is activated in the operating apparatus 12, the CPU 32C of the operating apparatus 12 functions as the RW controller 75, the processing unit 76, and the replacement unit 77 as illustrated in FIG. 13.

Figure 18:
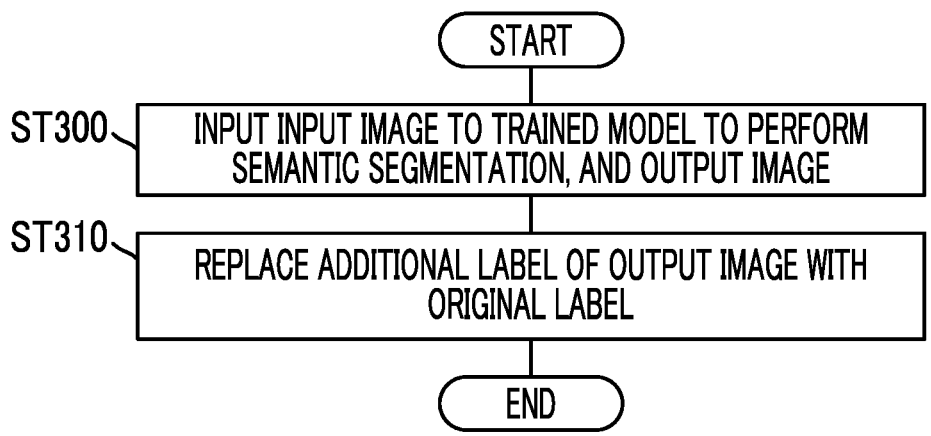
FIG. 18 is a flowchart illustrating a processing procedure of the operating apparatus.

In FIG. 18, in the operating apparatus 12, as illustrated in FIG. 14, the processing unit 76 inputs the input image II to the trained model TM to perform semantic segmentation, and outputs the output image OI (step ST300). The output image OI is output to the replacement unit 77. Step ST300 is an example of a "processing step" according to the disclosed technology.

As illustrated in FIG. 15, the additional label of the output image OI is replaced with the original label based on the label information LT by the replacement unit 77 (step ST310). For example, the replaced output image ROI in which the additional label is replaced with the original label is displayed on the display 34 of the operating apparatus 12 side by side with the input image II, and is provided for viewing by the user. Step ST310 is an example of a "replacement step" according to the disclosed technology.

As described above, in the image processing apparatus 10, as illustrated in FIG. 7, the complicated region CR is extracted from the designated region R of the annotation image AI by the extraction unit 46. As illustrated in FIG. 10, the additional label is set for the complicated region CR in addition to the original label originally designated for the annotation image AI by the setting unit 47. The modified annotation image MAI for which the additional label is set in this manner is given as the learning data LD to the model M in the learning apparatus 11, and the model M is trained. Accordingly, it is possible to suppress a decrease in the discrimination accuracy of the complicated region CR.

As illustrated in FIG. 10, the same additional label is set for the plurality of complicated region CRs extracted from the plurality of designated regions R in which the original labels indicate the same class by the setting unit 47. That is, the same additional label is set for the complicated regions CR of the designated regions R having the same original label. Accordingly, it is possible to prevent the additional labels from being indiscriminately provided. Since the discrimination accuracy of the class of the model M can be easily increased as the number of classes to be discriminated is small, in a case where the additional labels can be prevented from being indiscriminately provided, the discrimination accuracy of the class of the model M can be improved as a result.

As illustrated in FIGS. 9A to 9E, processing of extracting the complicated region CR is performed for each of the plurality of designated regions R by the extraction unit 46. Accordingly, it is possible to extract the complicated region CR from each of the designated regions R regardless of the size of the designated region R.

As illustrated in FIG. 11, in a case where the boundary between the first designated region and the second designated region is extracted as the complicated region CR in the extraction unit 46, one additional label related to any one of the first designated region or the second designated region is selectively set for the complicated region CR of the boundary by the setting unit 47. Accordingly, it is possible to avoid the setting of two additional labels for the complicated region CR having substantially the same position and substantially the same shape. Thus, the number of additional labels set can be reduced, and it is possible to prevent the model M from being unnecessarily trained and learning efficiency from being reduced.

In the operating apparatus 12, as illustrated in FIG. 14, the input image II is input to the trained model TM, semantic segmentation is performed, and the output image OI is output by the processing unit 76. As illustrated in FIG. 15, the additional label of the output image OI is replaced with the original label based on the label information LT by the replacement unit 77.

The additional label is conveniently set in the image processing apparatus 10 in order to suppress the decrease in the discrimination accuracy of the complicated region CR, and is unnecessary information for the user who creates the annotation image AI by designating only the class of the original label. Accordingly, the output image OI is used as the replaced output image ROI by replacing the additional label with the original label by the replacement unit 77, and thus, it is possible to provide an image originally required by the user.

Second Embodiment

Figure 19:
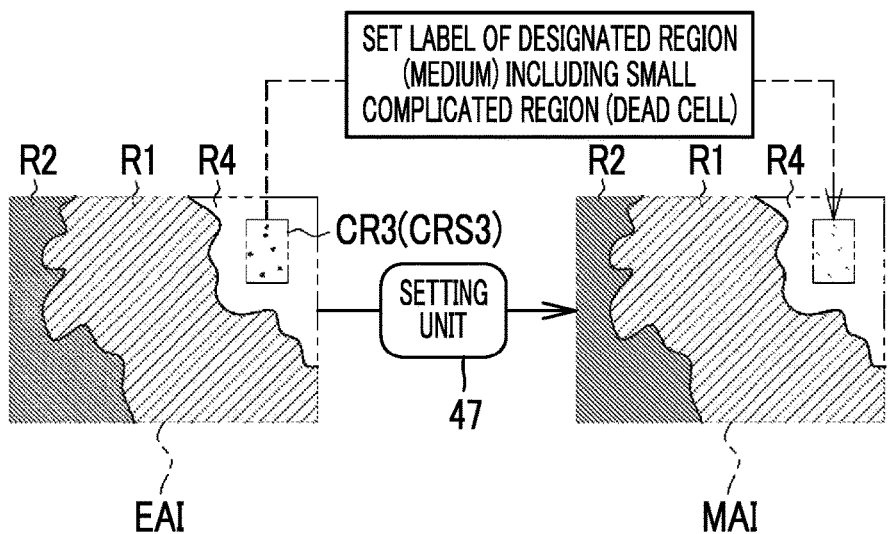
FIG. 19 is a diagram illustrating a scene in which an original label of a designated region including a small complicated region is set for the small complicated region by the setting unit.

In a second embodiment illustrated in FIG. 19, the setting unit 47 sets, for a small complicated region CRS equal to or less than a set size among complicated regions CR, an original label of a designated region R including the small complicated region CRS.

FIG. 19 illustrates a case where the complicated region CR3 of the "dead cell" of the label 3 is the small complicated region CRS3 and the small complicated region CRS3 is surrounded by the designated region R4 of the "medium" of the label 4. In this case, the setting unit 47 sets, for the small complicated region CRS3, the "medium" of the label 4 which is the original label of the designated region R4 including the small complicated region CRS3. By doing so, in the modified annotation image MAI, the small complicated region CRS3 is included in the designated region R4 and disappears.

As described above, in the second embodiment, the original label of the designated region R including the small complicated region CRS is set for the small complicated region CRS equal to or less than the set size in the complicated region CR by the setting unit 47. That is, the small complicated region CRS is regarded as noise such as dust, and the additional label is not set. Thus, the number of additional labels set can be reduced, and it is possible to prevent the model M from being unnecessarily trained and learning efficiency from being reduced.

In an annotation work, noise such as dust may be erroneously designated as the designated region R. In the second embodiment, it is possible to prevent the additional label from being set for the designated region R erroneously designated in this manner. The set size is set by the user, for example.

Third Embodiment

Figure 20:
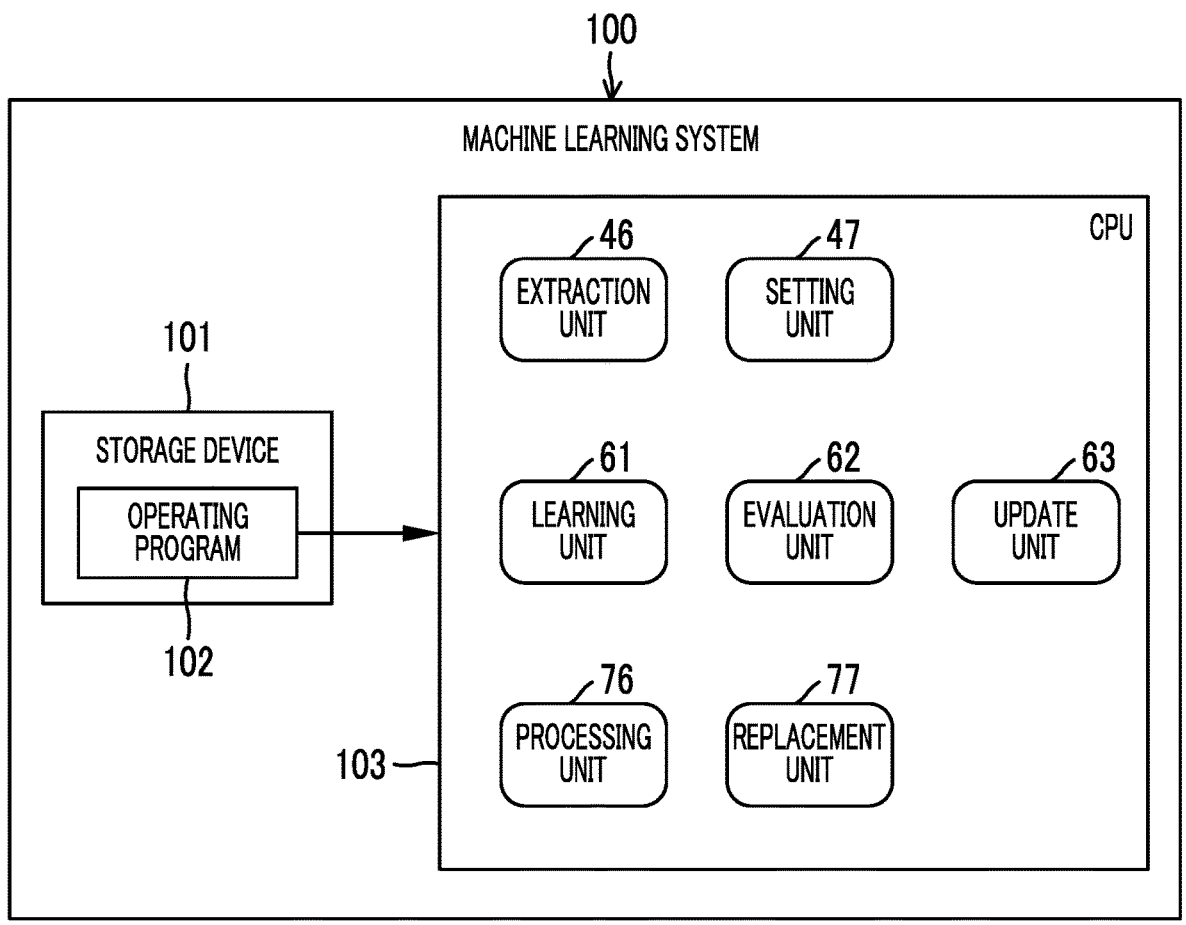
FIG. 20 is a block diagram illustrating a CPU of a machine learning system.

In a third embodiment illustrated in FIG. 20, the functions of the image processing apparatus 10, the learning apparatus 11, and the operating apparatus 12 are integrated into one computer.

In FIG. 20, similar to the image processing apparatus 10, the learning apparatus 11, and the operating apparatus 12, a machine learning system 100 is, for example, a desktop personal computer. An operating program 102 is stored in a storage device 101 of the machine learning system 100. The operating program 102 is an operating program in which the operating program 40, the operating program 55, and the operating program 70 according to the first embodiment are integrated. That is, the operating program 102 is an example of an "operating program of an image processing apparatus" and an "operating program of an operating apparatus" according to the disclosed technology. Although not illustrated, the storage device 101 also stores the annotation image AI, the modified annotation image MAI, the label information LT, the learning input image IIL, the model M, the trained model TM, the replaced output image ROI, and the like.

In a case where the operating program 102 is activated, a CPU 103 of the computer constituting the machine learning system 100 functions as the extraction unit 46, the setting unit 47, the learning unit 61, the evaluation unit 62, the update unit 63, the processing unit 76, and the replacement unit 77 in cooperation with a memory (not illustrated) or the like. That is, the machine learning system 100 is an apparatus in which the functions of the image processing apparatus 10, the learning apparatus 11, and the operating apparatus 12 according to the first embodiment are integrated. Since the tasks of processing of the units are the same as those of the first embodiment, the description thereof will be omitted.

As described above, a hardware configuration of the computer of the machine learning system can be appropriately changed according to required performance such as processing capability, safety, and reliability. Not only hardware but also application programs such as the operating programs 40, 55, 70, and 102 can be duplicated or can be distributed and stored in a plurality of storage devices in order to ensure safety and reliability.

In each of the above embodiments, although the images of the phase-contrast microscope on which the cells in culture appear illustrated as the input image II and the learning input image IIL and the cells, the medium, and the like are illustrated as the classes, the present invention is not limited thereto. For example, magnetic resonance imaging (MRI) images may be used as the input image II and the learning input image IIL, and organs such as a liver and a kidney may be used as the classes.

The model M is not limited to the U-Net, and may be another convolutional neural network, for example, SegNet.

In each of the above embodiments, for example, the following various processors can be used as a hardware structure of the processing units that execute various kinds of processing such as the RW controller 45, 60, or 75, the extraction unit 46, the setting unit 47, the transmission controller 48 or 64, the learning unit 61, the evaluation unit 62, the update unit 63, the processing unit 76, and the replacement unit 77. As described above, in addition to the CPU 32A, 32B, 32C, or 103 which is a general-purpose processor that functions as various processing units by executing software (operating program 40, 55, 70, or 102), the various processors include a programmable logic device (PLD), which is a processor capable of changing a circuit configuration after manufacture, such as a field programmable gate array (FPGA), and a dedicated electrical circuit, which is a processor having a circuit configuration specifically designed in order to execute specific processing such as an application specific integrated circuit (ASIC).

One processing unit may be constituted by one of these various processors, or may be constituted by a combination of two or more processors of the same type or different types (for example, a combination of a plurality of FPGAs and/or a combination of a CPU and a FPGA). The plurality of processing units may be constituted by one processor.

As an example in which the plurality of processing units are constituted by one processor, firstly, one processor is constituted by a combination of one or more CPUs and software as represented by computers such as clients and servers, and this processor functions as the plurality of processing units. Secondly, a processor that realizes the functions of the entire system including the plurality of processing units via one integrated circuit (IC) chip is used as represented by a system on chip (SoC). As described above, the various processing units are constituted by using one or more of the various processors as the hardware structure.

More specifically, an electric circuitry in which circuit elements such as semiconductor elements are combined can be used as the hardware structure of these various processors.

From the above description, the invention described in the following Appendixes 1 to 3 can be grasped.

Appendix 1

An image processing apparatus includes an extraction processor that extracts, from among a plurality of designated regions in which labels of classes are designated, complicated regions which are regions of at least a part of the designated regions and are regions having relatively complicated contours, in an annotation image given as learning data to a machine learning model for performing semantic segmentation in which a plurality of the classes in an image are discriminated on a per-pixel basis, and a setting processor that sets additional labels for the complicated regions separately from original labels originally designated for the annotation image.

Appendix 2

An operating apparatus includes a processing processor that inputs an input image to the machine learning model which is trained by using the annotation image for which the additional label is set in the image processing apparatus according to Appendix 1 as the learning data to cause the machine learning model to perform the semantic segmentation, and outputs an output image, and a replacement processor that replaces the additional label of the output image with the original label based on label information storing a relationship between the original label and the additional label.

Appendix 3

A machine learning system includes an extraction processor that extracts, from among a plurality of designated regions in which labels of classes are designated, complicated regions which are regions of at least a part of the designated regions and are regions having relatively complicated contours, in an annotation image given as learning data to a machine learning model for performing semantic segmentation in which a plurality of the classes in an image are discriminated on a per-pixel basis, a setting processor that sets additional labels for the complicated regions separately from original labels originally designated for the annotation image, a processing processor that inputs an input image to the machine learning model which is trained by using the annotation image for which the additional label is set as the learning data to cause the machine learning model to perform the semantic segmentation, and outputs an output image, and a replacement processor that replaces the additional label of the output image with the original label based on label information storing a relationship between the original label and the additional label.

The disclosed technology can also appropriately combine the various embodiments described above with various modification examples. The disclosed technology is not limited to the above embodiments, and may adopt various configurations without departing from the gist. The disclosed technology extends to a storage medium for storing the program non-temporarily in addition to the program.

The contents described and illustrated above are detailed descriptions for the portions related to the disclosed technology, and are merely an example of the disclosed technology. For example, the above description of the configurations, functions, actions, and effects is an example of the configurations, functions, actions, and effects of the portions of the disclosed technology. Thus, the deletion of unnecessary portions, the addition of new elements, or the substitution may be performed for the contents described and illustrated above without departing from the gist of the disclosed technology. In order to avoid complications and facilitate understanding of the portions related to the disclosed technology, in the contents described and illustrated above, common technical knowledge that does not particularly require description is not described in order to enable the implementation of the disclosed technology.

In the present specification, "A and/or B" has the same meaning as "at least one of A or B". That is, "A and/or B" means that only A may be used, only B may be used, or a combination of A and B may be used. In the present specification, the same concept as "A and/or B" is also applied to a case where three or more matters are expressed by "and/or".

All the documents, patent applications, and technical standards described in the present specification are incorporated in the present specification by reference to the same extent as a case where individual documents, patent applications, and technical standards are specifically and individually noted to be incorporated by reference.

What is claimed is:

1. An image processing apparatus comprising:
a processor that is configured to:
extract, from among a plurality of designated regions in which labels of classes are designated, complicated regions which are regions of at least a part of the plurality of designated regions and are regions having zigzag contours, in an annotation image given as learning data to a machine learning model for performing semantic segmentation in which a plurality of the classes in an image are discriminated on a per-pixel basis; and
set additional labels for the complicated regions separately from original labels originally designated for the annotation image.

2. The image processing apparatus according to claim 1, wherein the processor sets the same additional label for a plurality of the complicated regions extracted from the plurality of designated regions in which the original labels indicate the same class.

3. The image processing apparatus according to claim 1, wherein the processor performs processing of extracting the complicated region for each of the plurality of designated regions.

4. The image processing apparatus according to claim 1, wherein in a case where the processor extracts, as the complicated region, a boundary between a first designated region and a second designated region, the processor selectively sets one additional label related to any one of the first designated region or the second designated region for the complicated region of the boundary.

5. The image processing apparatus according to claim 1, wherein the processor sets, for a small complicated region equal to or less than a set size among the complicated regions, the original label of one of the plurality of designated regions including the small complicated region.

6. An operating apparatus comprising a processor configured to:
input an input image to the machine learning model which is trained by using the annotation image for which the additional label is set in the image processing apparatus according to claim 1 as the learning data to cause the machine learning model to perform the semantic segmentation, and outputs an output image; and
replace the additional label of the output image with the original label based on label information storing a relationship between the original label and the additional label.

7. An operation method of an image processing apparatus, comprising:
extracting, from among a plurality of designated regions in which labels of classes are designated, each of the plurality of designated region being surrounded by a contour, complicated regions which are regions of at least a part of the plurality of designated regions and are regions having zigzag contours, in an annotation image given as learning data to a machine learning model for performing semantic segmentation in which a plurality of the classes in an image are discriminated on a per-pixel basis; and
setting additional labels for the complicated regions separately from original labels originally designated for the annotation image.

8. An operation method of an operating apparatus, comprising:
inputting an input image to a machine learning model which is trained by using the annotation image for which the additional label is set in the operation method of the image processing apparatus according to claim 7 as the learning data to cause the machine learning model to perform the semantic segmentation, and outputting an output image; and
replacing the additional label of the output image with the original label based on label information storing a relationship between the original label and the additional label.

9. A non-transitory computer-readable storage medium storing an operating program of an image processing apparatus causing a computer to:
extract, from among a plurality of designated regions in which labels of classes are designated, complicated regions which are regions of at least a part of the plurality of designated regions and are regions having zigzag contours, in an annotation image given as learning data to a machine learning model for performing semantic segmentation in which a plurality of the classes in an image are discriminated on a per-pixel basis; and
set additional labels for the complicated regions separately from original labels originally designated for the annotation image.

10. A non-transitory computer-readable storage medium storing an operating program of an operating apparatus causing a computer to:
input an input image to the machine learning model which is trained by using the annotation image for which the additional label is set in the operating program of the image processing apparatus according to claim 9 as the learning data to cause the machine learning model to perform the semantic segmentation, and outputs an output image; and
replace the additional label of the output image with the original label based on label information storing a relationship between the original label and the additional label.

11. A machine learning system comprising a processor configured to:
extract, from among a plurality of designated regions in which labels of classes are designated, complicated regions which are regions of at least a part of the plurality of designated regions and are regions having zigzag contours, in an annotation image given as learning data to a machine learning model for performing semantic segmentation in which a plurality of the classes in an image are discriminated on a per-pixel basis;
set additional labels for the complicated regions separately from original labels originally designated for the annotation image;
input an input image to the machine learning model which is trained by using the annotation image for which the additional label is set as the learning data to cause the machine learning model to perform the semantic segmentation, and outputs an output image; and
replace the additional label of the output image with the original label based on label information storing a relationship between the original label and the additional label.

* * * * *